United States Patent
Chang et al.

(10) Patent No.: US 12,360,289 B2
(45) Date of Patent: Jul. 15, 2025

(54) METHOD FOR MAKING EMBEDDED HYDROGEL CONTACT LENSES

(71) Applicant: Alcon Inc., Fribourg (CH)

(72) Inventors: Yuan Chang, Atlanta, GA (US); Junhao Ge, Redwood City, CA (US); Ying Pi, Suwanee, GA (US); Cornelius Daniel Niculas, Suwanee, GA (US); Yang Zheng, Alpharetta, GA (US); Steve Yun Zhang, Sugar Hill, GA (US); Michelle Plavnik, Atlanta, GA (US); Ethan Leveillee, Atlanta, GA (US); Jing Cheng, Brea, CA (US); Augustine Twum Kumi, Grayson, GA (US)

(73) Assignee: Alcon Inc., Fribourg (CH)

( * ) Notice: Subject to any disclaimer, the term of this patent is extended or adjusted under 35 U.S.C. 154(b) by 619 days.

(21) Appl. No.: 17/710,224

(22) Filed: Mar. 31, 2022

(65) Prior Publication Data

US 2022/0326412 A1    Oct. 13, 2022

Related U.S. Application Data

(60) Provisional application No. 63/169,387, filed on Apr. 1, 2021.

(51) Int. Cl.
*G02B 1/04* (2006.01)
*B29D 11/00* (2006.01)
(Continued)

(52) U.S. Cl.
CPC ........ *G02B 1/043* (2013.01); *B29D 11/00067* (2013.01); *B29D 11/00134* (2013.01);
(Continued)

(58) Field of Classification Search
CPC .............. G02B 1/043; B29D 11/00067; B29D 11/00134; B29D 11/0048;
(Continued)

(56) References Cited

U.S. PATENT DOCUMENTS

| 4,136,250 A | 1/1979 | Mueller et al. |
| 4,153,641 A | 5/1979 | Deichert et al. |

(Continued)

FOREIGN PATENT DOCUMENTS

| EP | 0632329 A1 | 1/1995 |
| TW | 200720067 A | 6/2007 |
| WO | 2013175561 A1 | 11/2013 |

OTHER PUBLICATIONS

K. J. Sax, et al. "Preparation and Infrared Absorption Spectra of Some Phenyl Ethers", J. Org. Chem., 1960, vol. 25(9), pp. 1590-1595.

*Primary Examiner* — Travis S Fissel
(74) *Attorney, Agent, or Firm* — Jian Zhou

(57) ABSTRACT

The invention is directed to an embedded hydrogel contact lens, which comprises an insert sandwiched between two layers of hydrogel materials and can be produced according to a cast molding method including the procedures involving two females halves (FC1 and FC2) and two male halves (BC1 and BC2) and three consequential molding steps involving three molding assemblies: the 1st one formed between FC1 and BC1 for molding an insert; the $2^{nd}$ one formed between FC1 and BC2 for molding a lens precursor having the molded insert embedded in a layer of a hydrogel material in a way that the front surface of the molded insert merges with the convex surface of the lens precursor; and the 3rd one formed between FC2 and BC2 for molding an embedded hydrogel contact of the invention.

9 Claims, 3 Drawing Sheets

(51) Int. Cl.
  *B29K 105/00* (2006.01)
  *C08G 77/442* (2006.01)
  *G02C 7/04* (2006.01)
  *B29K 83/00* (2006.01)
  *C08G 77/00* (2006.01)

(52) U.S. Cl.
  CPC ............ *C08G 77/442* (2013.01); *G02C 7/04* (2013.01); *B29K 2083/00* (2013.01); *B29K 2105/0061* (2013.01); *C08G 77/80* (2013.01)

(58) Field of Classification Search
  CPC ........ B29D 11/00038; B29D 11/00057; B29D 11/00125; B29D 11/00221; B29D 11/00403; C08G 77/442; C08G 77/80; G02C 7/04; G02C 7/049; G02C 7/102; B29K 2083/00; B29K 2105/0061; B29K 2633/08; B29K 2715/00; C08J 3/075; C08J 3/24; C08J 2383/04
  USPC .................................................... 351/159.02
  See application file for complete search history.

(56) References Cited

U.S. PATENT DOCUMENTS

| | | |
|---|---|---|
| 4,182,822 A | 1/1980 | Chang |
| 4,189,546 A | 2/1980 | Deichert et al. |
| 4,254,248 A | 3/1981 | Friends et al. |
| 4,259,467 A | 3/1981 | Keogh et al. |
| 4,260,725 A | 4/1981 | Keogh et al. |
| 4,261,875 A | 4/1981 | LeBoeuf |
| 4,268,132 A | 5/1981 | Neefe |
| 4,276,402 A | 6/1981 | Chromecek et al. |
| 4,327,203 A | 4/1982 | Deichert et al. |
| 4,341,889 A | 7/1982 | Deichert et al. |
| 4,343,927 A | 8/1982 | Chang |
| 4,355,147 A | 10/1982 | Deichert et al. |
| 4,401,371 A | 8/1983 | Neefe |
| 4,444,711 A | 4/1984 | Schad |
| 4,460,534 A | 7/1984 | Boehm et al. |
| 4,486,577 A | 12/1984 | Mueller |
| 4,543,398 A | 9/1985 | Bany |
| 4,605,712 A | 8/1986 | Mueller |
| 4,661,575 A | 4/1987 | Tom |
| 4,684,538 A | 8/1987 | Klemarczyk |
| 4,703,097 A | 10/1987 | Wingler |
| 4,833,218 A | 5/1989 | Lee |
| 4,837,289 A | 6/1989 | Mueller |
| 4,929,693 A | 5/1990 | Akashi |
| 4,954,586 A | 9/1990 | Nobuyuki et al. |
| 4,954,587 A | 9/1990 | Mueller |
| 5,010,141 A | 4/1991 | Mueller |
| 5,034,461 A | 7/1991 | Lai et al. |
| 5,039,761 A | 8/1991 | Ono |
| 5,070,170 A | 12/1991 | Robertson |
| 5,070,215 A | 12/1991 | Bambury et al. |
| 5,079,319 A | 1/1992 | Mueller |
| 5,098,546 A | 3/1992 | Kawashima et al. |
| 5,156,726 A | 10/1992 | Nakada et al. |
| 5,166,345 A | 11/1992 | Akashi et al. |
| 5,346,946 A | 9/1994 | Yokoyama et al. |
| 5,358,995 A | 10/1994 | Lai |
| 5,387,632 A | 2/1995 | Lai |
| 5,416,132 A | 5/1995 | Yokoyama et al. |
| 5,449,729 A | 9/1995 | Lai |
| 5,451,617 A | 9/1995 | Lai |
| 5,486,579 A | 1/1996 | Lai et al. |
| 5,527,925 A | 6/1996 | Chabrecek et al. |
| 5,583,163 A | 12/1996 | Müller |
| 5,665,840 A | 9/1997 | Pöhlmann et al. |
| 5,712,356 A | 1/1998 | Bothe et al. |
| 5,760,100 A | 6/1998 | Nicolson et al. |
| 5,843,346 A | 12/1998 | Morrill |
| 5,849,841 A | 12/1998 | Mühlebach et al. |
| 5,894,002 A | 4/1999 | Boneberger et al. |
| 5,962,548 A | 10/1999 | Vanderlaan |
| 5,981,675 A | 11/1999 | Valiant, Jr. |
| 6,017,121 A | 1/2000 | Chateau et al. |
| 6,019,914 A | 2/2000 | Lokshin et al. |
| 6,039,913 A | 3/2000 | Hirt |
| 6,113,814 A | 9/2000 | Gemert et al. |
| 6,149,841 A | 11/2000 | Kumar |
| 6,165,408 A | 12/2000 | Steinmann |
| 6,166,236 A | 12/2000 | Bambury |
| 6,221,303 B1 | 4/2001 | Steinmann |
| 6,296,785 B1 | 10/2001 | Nelson et al. |
| 6,303,687 B1 | 10/2001 | Müller |
| 6,348,604 B1 | 2/2002 | Nelson et al. |
| 6,472,489 B1 | 10/2002 | Stockinger |
| 6,479,587 B1 | 11/2002 | Stockinger et al. |
| 6,492,478 B1 | 12/2002 | Steinmann |
| 6,579,918 B1 | 6/2003 | Auten |
| 6,762,264 B2 | 7/2004 | Kunzler |
| 6,851,805 B2 | 2/2005 | Blum et al. |
| 6,867,245 B2 | 3/2005 | Iwata et al. |
| 6,995,192 B2 | 2/2006 | Phelan et al. |
| 7,104,648 B2 | 9/2006 | Dahi et al. |
| 7,214,809 B2 | 5/2007 | Zanini |
| 7,423,074 B2 | 9/2008 | Lai |
| 7,490,936 B2 | 2/2009 | Blum et al. |
| 7,556,750 B2 | 7/2009 | Xiao et al. |
| 7,584,630 B2 | 9/2009 | Van Gemert |
| 7,605,190 B2 | 10/2009 | Moszner et al. |
| 7,883,207 B2 | 2/2011 | Iyer |
| 7,931,832 B2 | 4/2011 | Pugh et al. |
| 7,977,430 B2 | 7/2011 | Devlin et al. |
| 7,999,989 B2 | 8/2011 | Asai et al. |
| 8,154,804 B2 | 4/2012 | McGinn et al. |
| 8,158,037 B2 | 4/2012 | Chopra et al. |
| 8,215,770 B2 | 7/2012 | Blum et al. |
| 8,348,424 B2 | 1/2013 | Pugh et al. |
| 8,415,405 B2 | 4/2013 | Maggio |
| 8,475,529 B2 | 7/2013 | Clarke |
| 8,480,227 B2 | 7/2013 | Qiu et al. |
| 8,529,057 B2 | 9/2013 | Qiu |
| 8,614,261 B2 | 12/2013 | Iwata |
| 8,658,748 B2 | 2/2014 | Liu et al. |
| 8,697,770 B2 | 4/2014 | Duis et al. |
| 8,741,188 B2 | 6/2014 | Chopra et al. |
| 8,835,525 B2 | 9/2014 | Kuyu et al. |
| 8,874,182 B2 | 10/2014 | Etzkorn et al. |
| 8,922,898 B2 | 12/2014 | Legerton et al. |
| 8,993,651 B2 | 3/2015 | Chang |
| 9,052,438 B2 | 6/2015 | Xiao et al. |
| 9,097,840 B2 | 8/2015 | Chang et al. |
| 9,097,916 B2 | 8/2015 | Chopra et al. |
| 9,103,965 B2 | 8/2015 | Chang |
| 9,155,614 B2 | 10/2015 | Blum et al. |
| 9,176,332 B1 | 11/2015 | Etzkorn et al. |
| 9,217,813 B2 | 12/2015 | Liu et al. |
| 9,296,158 B2 | 3/2016 | Pugh et al. |
| 9,465,234 B2 | 10/2016 | Chopra et al. |
| 9,475,827 B2 | 10/2016 | Chang et al. |
| 9,618,773 B2 | 4/2017 | Clarke |
| 9,731,437 B2 | 8/2017 | Pugh et al. |
| 9,789,655 B1 * | 10/2017 | Weibel ................ B29C 37/0067 |
| 9,889,615 B2 | 2/2018 | Pugh et al. |
| 9,904,074 B2 | 2/2018 | Duis et al. |
| 9,977,260 B2 | 5/2018 | Pugh et al. |
| 10,064,977 B2 | 9/2018 | Jiang et al. |
| 10,081,697 B2 | 9/2018 | Huang et al. |
| 10,197,707 B2 | 2/2019 | Xiao et al. |
| 10,203,521 B2 | 2/2019 | Pugh et al. |
| 10,209,534 B2 | 2/2019 | Alli et al. |
| 10,301,451 B2 | 5/2019 | Jing et al. |
| 10,465,047 B2 | 11/2019 | Jing et al. |
| 2004/0141150 A1 | 7/2004 | Roffman et al. |
| 2007/0036878 A1 | 2/2007 | Goodenough |
| 2009/0091818 A1 | 4/2009 | Haddock et al. |
| 2010/0076553 A1 | 3/2010 | Pugh et al. |
| 2011/0157544 A1 | 6/2011 | Pugh et al. |
| 2012/0140167 A1 | 6/2012 | Blum |

(56) References Cited

U.S. PATENT DOCUMENTS

2014/0125944 A1  5/2014  Huang
2018/0030209 A1  2/2018  Sawyer et al.
2018/0250898 A1  9/2018  Archer et al.

\* cited by examiner

METHOD FOR MAKING EMBEDDED HYDROGEL CONTACT LENSES

This application claims the benefit under 35 USC § 119 (e) of U.S. provisional application No. 63/169,387 filed on 1 Apr. 2021, incorporated by references in its entirety.

The present invention generally relates to a method for producing embedded hydrogel contact lenses. In addition, the present invention provides embedded hydrogel contact lenses produced according to a method of the invention.

BACKGROUND

Hydrogel contact lenses are widely used for correcting many different types of vision deficiencies due to their softness for wearing comfort. They are made of a hydrated, crosslinked polymeric material that contains from about 20% to about 75% by weight of water within the lens polymer matrix at equilibrium. Hydrogel contact lenses generally are produced according to the conventional full cast-molding process. Such a conventional manufacturing process comprises at least the following steps: lens molding (i.e., curing a polymerizable composition in lens molds), demolding (i.e., removing lenses from molds), extracting lenses with an extraction medium, hydrating lenses, packaging, and sterilizing the hydrated lenses. During the lens hydration, the hydrogel contact lenses will absorb water and typically can swell significantly in size.

In recent years, it has been proposed that various inserts can be incorporated in hydrogel contact lenses for various purposes, e.g., for corneal health, vision correction, diagnosis, etc. See, for example, U.S. Pat. Nos. 4,268,132, 4,401, 371, 5,098,546, 5,156,726, 6,851,805, 7,104,648, 7,490,936, 7,883,207, 7,931,832, 8,154,804, 8,215,770, 8,348,424, 8,874,182, 8,922,898, 9,155,614, 9,176,332, 9,296,158, 9,618,773, 9,731,437, 9,889,615, 9,977,260, 10,203,521, and 10,209,534; and U.S. Pat. Appl. Pub. Nos. 2004/0141150, 2009/0091818, 2010/0076553, 2011/0157544, and 2012/0140167).

An insert typically needs to be placed and fixed precisely in a specifically designed position in an embedded hydrogel contact lens. It is a great challenge to produce embedded hydrogel contact lenses that comprise one or more inserts embedded in specific positions in the embedded hydrogel contact lenses. A typical approach is to use molds having positioning guides (posts) provided on their molding surface for cast-molding embedded hydrogel contact lenses. Those positioning guides (posts) provides means for precisely positioning inserts in molds during cast-molding process. However, by using such molds with positioning guides (posts), small holes derived from those positioning guides (posts) are formed in resultant embedded hydrogel contact lenses. Those small holes in the embedded hydrogel lenses are susceptible to bioburden trapping.

Therefore, there is still a need for producing embedded hydrogel contact lenses (preferably embedded silicone hydrogel contact lenses) having inserts positioned accurately therein in a relatively efficient and consistent manner and which can be readily implemented in a production environment.

SUMMARY OF THE INVENTION

In some aspects, the invention provides a method for producing embedded hydrogel contact lenses, the method of invention comprising the steps of: (1) obtaining a first female mold half, a first male mold half, a second female mold half, and a second male mold half, wherein the first female mold half has a first molding surface having a central portion defining the front surface of a to-be-molded insert, wherein the first male mold half has a second molding surface defining the back surface of the to-be-molded insert, wherein the second female mold half has a third molding surface defining the anterior surface of an embedded hydrogel contact lens, wherein the second male mold half has a fourth molding surface defining the posterior surface of the embedded hydrogel contact lens, wherein the first female mold half and the first male mold half are configured to receive each other such that a first molding cavity is formed between the central portion of the first molding surface and the second molding surfaces when the first female and first male mold halves are closed securely, wherein the first female mold half and the second male mold half are configured to receive each other such that a second molding cavity is formed between the first and fourth molding surfaces when the first female mold half is closed with the second male mold half, wherein the second female mold half and the second male mold half are configured to receive each other such that a third molding cavity is formed between the third and fourth molding surfaces when the second female mold half is closed securely with the second male mold half; (2) dispensing an amount of an insert-forming composition on the central portion of the first molding surface of the first female mold half; (3) placing the first male mold half on top of the insert-forming composition in the first female mold half and closing the first male mold half and the first female mold half to form a first molding assembly comprising the insert-forming composition therein; (4) curing the insert-forming composition in the first molding assembly to form a molded insert that has the front surface defined by the central portion of the first molding surface and the back surface defined by the second molding surface; (5) separating the first molding assembly obtained in step (4) into the first male mold half and the first female mold half with the molded insert adhered onto the central portion of the first molding surface of the first female mold half; (6) dispensing an amount of a first lens-forming composition over the molded insert adhered on the central portion of the first molding surface in the first female mold half; (7) placing the second male mold half on top of the first female mold half and closing the second male mold half and the first female mold half to form a second molding assembly comprising the first lens-forming composition and the molded insert immersed therein in the second molding assembly; (8) curing the first lens-forming composition in the second molding assembly to form a lens precursor having a convex surface defined by the first molding surface and an opposite concave surface that is defined by the fourth molding surface and is the posterior surface of the embedded hydrogel contact lens, wherein the lens precursor comprise a first hydrogel material formed from the first lens-forming composition and the insert embedded in the first material in such a way that the front surface of the insert merges with the convex surface of the lens precursor while the back surface of the insert is buried beneath the concave surface of the lens precursor; (9) separating the second molding assembly obtained in step (8) into the second male mold half and the female mold half, with the lens precursor adhered on the second male mold half; (10) dispensing an amount of a second lens-forming composition on the third molding surface of the second female mold half; over the molded insert adhered on the central portion of the first molding surface in the first female mold half; (11) placing the second male mold half obtained in step (9) on top of the second female mold half and closing the second male mold half and the second female mold half to form a third molding assembly comprising the second lens-forming composition and the lens precursor immersed therein in the third molding assembly; (12) curing the second lens-forming composition in the third molding assembly to form an embedded hydrogel contact lens that comprises the insert sandwiched between the first hydrogel material and a second hydrogel material formed from the second lens-forming composition; (13) separating the third molding assembly obtained in step (12) into the second male mold half and the second female mold half, with the embedded hydrogel contact lens adhered on one of the second male mold half and the second female mold half; (14) removing the embedded hydrogel contact lens from the lens-adhered mold half (preferably before the embedded hydrogel contact lens is contact with water or any liquid); and (15) subjecting the embedded hydrogel contact lens to post-molding processes including a hydration process and one or more other processes selected from the group consisting of extraction, surface treatment, packaging, sterilization, and combinations thereof.

In other aspects, the invention provides an embedded hydrogel contact lens, comprising: an anterior surface, an opposite posterior surface, a diameter of from about 13.5 mm to about 15.5 mm and an insert which is sandwiched by one anterior layer of a first hydrogel material and one posterior layer of a second hydrogel material, wherein the anterior layer includes the anterior surface and the posterior layer includes the posterior surface, wherein the insert is made of a crosslinked polymeric material and has a front surface, an opposite back surface and a diameter of less than 13.0 mm, wherein the insert is located in a central portion of the embedded hydrogel contact lens, wherein the anterior layer and the posterior layer independent of each other have a center thickness of at least about 15 microns, wherein the first and second hydrogel material is identical to each other or different from each other, wherein the embedded hydrogel contact lens is not susceptible to delamination as demonstrated by being free of bubble that can be observed under microscopy at interfaces between the insert and the bulk material within the embedded silicone hydrogel contact lens after being autoclaved in a packaging solution in a sealed package and then being stored for at least 3 weeks at 55° C., wherein the packaging solution is a buffered saline having a pH of 7.1±0.2.

These and other aspects of the invention will become apparent from the following description of the presently preferred embodiments. The detailed description is merely illustrative of the invention and does not limit the scope of the invention, which is defined by the appended claims and equivalents thereof. As would be obvious to one skilled in the art, many variations and modifications of the invention may be effected without departing from the spirit and scope of the novel concepts of the disclosure.

DETAILED DESCRIPTION OF EMBODIMENTS OF THE INVENTION

Figure 1:
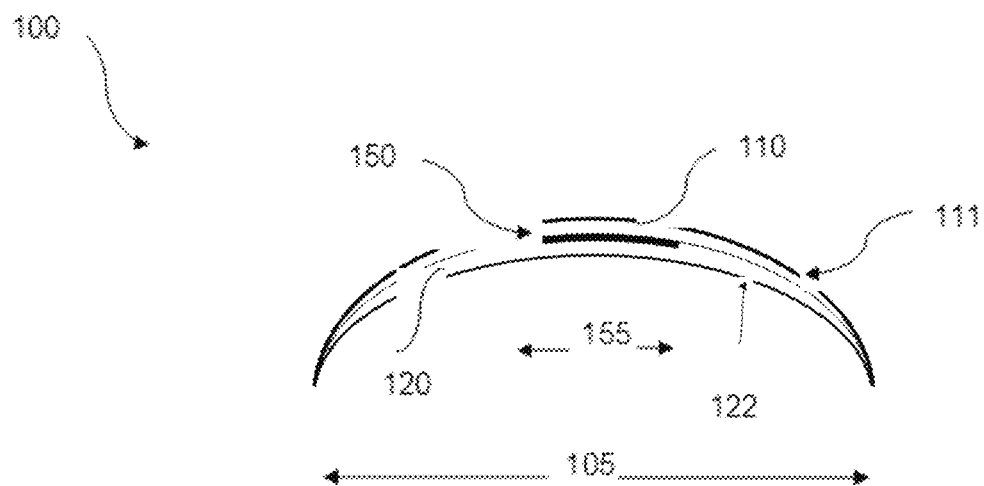
FIG. 1 schematically illustrates an embedded hydrogel contact lens according to a preferred embodiment of the invention.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well-known and commonly employed in the art.

"About" as used herein in this application means that a number, which is referred to as "about", comprises the recited number plus or minus 1-10% of that recited number.

"Contact Lens" refers to a structure that can be placed on or within a wearer's eye. A contact lens can correct, improve, or alter a user's eyesight, but that need not be the case. A contact lens can be of any appropriate material known in the art or later developed, and can be a soft lens, a hard lens, or an embedded lens.

A "hydrogel contact lens" refers to a contact lens comprising a hydrogel bulk (core) material. A hydrogel bulk material can be a non-silicone hydrogel material or preferably a silicone hydrogel material.

A "hydrogel" or "hydrogel material" refers to a crosslinked polymeric material which has three-dimensional polymer networks (i.e., polymer matrix), is insoluble in water, but can hold at least 10% by weight of water in its polymer matrix when it is fully hydrated (or equilibrated).

A siloxane, which often also described as a silicone, refers to a molecule having at least one moiety of —Si—O—Si— where each Si atom carries two organic groups as substituents.

A "silicone hydrogel" or "SiHy" refers to a silicone-containing hydrogel obtained by copolymerization of a polymerizable composition comprising at least one silicone-containing vinylic monomer and/or at least one silicone-containing vinylic crosslinker.

As used in this application, the term "non-silicone hydrogel" or "non-silicone hydrogel material" interchangeably refers to a hydrogel that is theoretically free of silicon.

An "embedded hydrogel contact lens" refers a hydrogel contact lens comprising at least one insert which is embedded within the bulk hydrogel material of the embedded hydrogel contact lens to an extend that at most one of the anterior or posterior surfaces of the insert can be exposed fully or partially.

An "insert" refers to any 3-dimensional article which has a dimension of at least 5 microns but is smaller in dimension sufficient to be embedded in the bulk material of an embedded hydrogel contact lens and which is made of a crosslinked polymeric material.

In accordance with the invention, an insert of the invention has a thickness less than any thickness of an embedded hydrogel contact lens in the region where the insert is embedded. An insert can be any object have any geometrical shape and can have any desired functions. Examples of preferred inserts include without limitation thin rigid inserts for providing rigid center optics for masking astigmatism like a rigid gas permeable (RGP) contact lens, multifocal lens inserts, photochromic inserts, cosmetic inserts having color patterns printed thereon, etc.

"Hydrophilic," as used herein, describes a material or portion thereof that will more readily associate with water than with lipids.

"Hydrophobic" in reference to an insert material or insert that has an equilibrium water content (i.e., water content in fully hydrated state) of less than 5% (preferably about 4% or less, more preferably about 3% or less, even more preferably about 2% or less).

The term "room temperature" refers to a temperature of about 22° C. to about 26° C.

The term "soluble", in reference to a compound or material in a solvent, means that the compound or material can be dissolved in the solvent to give a solution with a concentration of at least about 0.5% by weight at room temperature (i.e., a temperature of about 22° C. to about 26° C.).

The term "insoluble", in reference to a compound or material in a solvent, means that the compound or material can be dissolved in the solvent to give a solution with a concentration of less than 0.01% by weight at room temperature (as defined above).

A "vinylic monomer" refers to a compound that has one sole ethylenically unsaturated group, is soluble in a solvent, and can be polymerized actinically or thermally.

As used in this application, the term "ethylenically unsaturated group" is employed herein in a broad sense and is intended to encompass any groups containing at least one >C=C<group. Exemplary ethylenically unsaturated groups include without limitation

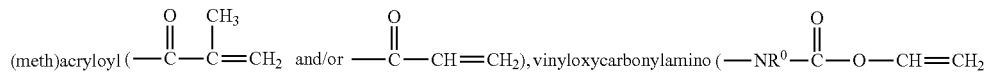

in which $R^o$ is H or $C_1$-$C_4$ alkyl),

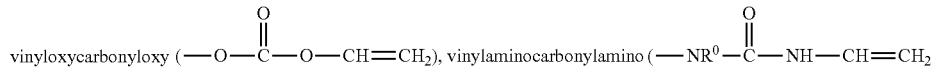

in which $R^o$ is H or $C_1$-$C_4$ alkyl),

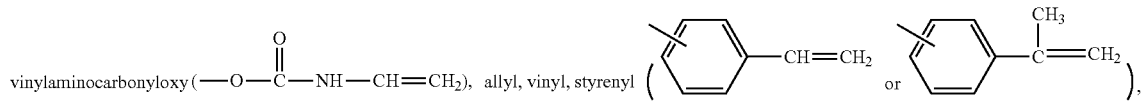

or other C=C containing groups.

An "acrylic monomer" refers to a vinylic monomer having one sole (meth)acryloyl group. Examples of acrylic monomrs includes (meth)acryloxy[or(meth)acryloyloxy] monomers and (meth)acrylamido monomers.

An "(meth)acryloxy monomer" or "(meth)acryloyloxy monomer" refers to a vinylic monomer having one sole group of

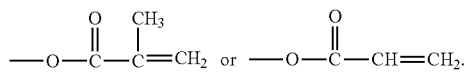

An "(meth)acrylamido monomer" refers to a vinylic monomer having one sole group of

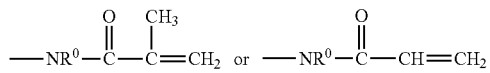

in which $R^o$ is H or $C_1$-$C_4$ alkyl.

The term "aryl acrylic monomer" refers to an acrylic monomer having at least one aromatic ring.

The term "(meth)acrylamide" refers to methacrylamide and/or acrylamide.

The term "(meth)acrylate" refers to methacrylate and/or acrylate.

An "N-vinyl amide monomer" refers to an amide compound having a vinyl group (—CH=CH$_2$) that is directly attached to the nitrogen atom of the amide group.

The term "ene group" refers to a monovalent radical of CH$_2$=CH— or CH$_2$=CCH$_3$— that is not covalently attached to an oxygen or nitrogen atom or a carbonyl group.

An "ene monomer" refers to a vinylic monomer having one sole ene group.

A "hydrophilic vinylic monomer" respectively refers to a vinylic monomer, an acrylic monomer, a (meth)acryloxy monomer, or a (meth)acrylamido monomer), which typically yields a homopolymer that is water-soluble or can absorb at least 10 percent by weight of water.

A "hydrophobic vinylic monomer" respectively refers to a vinylic monomer, an acrylic monomer, a (meth)acryloxy monomer, or a (meth)acrylamido monomer), which typically yields a homopolymer that is insoluble in water and can absorb less than 10% by weight of water.

As used in this application, the term "vinylic crosslinker" refers to an organic compound having at least two ethylenically unsaturated groups. A "vinylic crosslinking agent" refers to a vinylic crosslinker having a molecular weight of 700 Daltons or less.

An "acrylic crosslinker" refers to a vinylic crosslinker having at least two (meth)acryloyl groups.

The term "acrylic repeating units" refers to repeating units of a polymeric material, each of which is derived from an acrylic monomer or crosslinker in a free-radical polymerization to form the polymeric material.

The term "terminal (meth)acryloyl group" refers to one (meth)acryloyl group at one of the two ends of the main chain (or backbone) of an organic compound as known to a person skilled in the art.

As used herein, "actinically" in reference to curing, crosslinking or polymerizing of a polymerizable composition, a prepolymer or a material means that the curing (e.g., crosslinked and/or polymerized) is performed by actinic irradiation, such as, for example, UV/visible irradiation, ionizing radiation (e.g. gamma ray or X-ray irradiation), microwave irradiation, and the like. Thermal curing or actinic curing methods are well-known to a person skilled in the art.

As used in this application, the term "polymer" means a material formed by polymerizing/crosslinking one or more monomers or macromers or prepolymers or combinations thereof.

A "macromer" or "prepolymer" refers to a compound or polymer that contains ethylenically unsaturated groups and has a number average molecular weight of greater than 700 Daltons.

As used in this application, the term "molecular weight" of a polymeric material (including monomeric or macromeric materials) refers to the number-average molecular weight unless otherwise specifically noted or unless testing conditions indicate otherwise. A skilled person knows how to determine the molecular weight of a polymer according to known methods, e.g., GPC (gel permeation chromatochraphy) with one or more of a refractive index detector, a low-angle laser light scattering detector, a multi-angle laser light scattering detector, a differential viscometry detector, a UV detector, and an infrared (IR) detector; MALDI-TOF MS (matrix-assisted laser desorption/ionization time-of-flight mass spectroscopy); $^1$H NMR (Proton nuclear magnetic resonance) spectroscopy, etc.

A "polysiloxane segment" or "polydiorganosiloxane segment" interchangeably refers to a polymer chain segment (i.e., a divalent radical) of

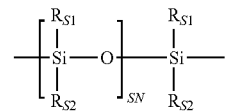

in which SN is an integer of 3 or larger and each of $R_{s1}$ and $R_{s2}$ independent of one another are selected from the group consisting of: $C_1$-$C_{10}$ alkyl; phenyl; $C_1$-$C_4$-alkyl-substituted phenyl; $C_1$-$C_4$-alkoxy-substituted phenyl; phenyl-$C_1$-$C_6$-alkyl; $C_1$-$C_{10}$ fluoroalkyl; $C_1$-$C_{10}$ fluoroether; aryl; aryl $C_1$-$C_{18}$ alkyl; -alk-(OC$_2$H$_4$)$_{\gamma 1}$—OR$^o$ (in which alk is $C_1$-$C_6$ alkylene diradical, $R^o$ is H or $C_1$-$C_4$ alkyl and γ1 is an integer from 1 to 10); a $C_2$-$C_{40}$ organic radical having at least one functional group selected from the group consisting of hydroxyl group (—OH), carboxyl group (—COOH), amino group (—NR$_{N1}$R$_{N1}$'), amino linkages of —NR$_{N1}$—, amide linkages of —CONR$_{N1}$—, amide of —CONR$_{N1}$R$_{N1}$', urethane linkages of —OCONH—, and $C_1$-$C_4$ alkoxy group, or a linear hydrophilic polymer chain, in which $R_{N1}$ and $R_{N1}$' independent of each other are hydrogen or a $C_1$-$C_{15}$ alkyl; and a photochromic organic radical having a photochromic group.

A "polysiloxane vinylic monomer" refers to a compound comprising at least one polysiloxane segment and one sole ethylenically-unsaturated group.

A "polydiorganosiloxane vinylic crosslinker" or "polysiloxane vinylic crosslinker" interchangeably refers to a compound comprising at least one polysiloxane segment and at least two ethylenically-unsaturated groups.

A "linear polydiorganosiloxane vinylic crosslinker" or "linear polysiloxane vinylic crosslinker" interchangeably refers to a compound comprising a main chain which includes at least one polysiloxane segment and is terminated with one ethylenically-unsaturated group at each of the two ends of the main chain.

A "chain-extended polydiorganosiloxane vinylic crosslinker" or "chain-extended polysiloxane vinylic crosslinker" interchangeably refers to a compound comprising at least two ethylenically-unsaturated groups and at least two polysiloxane segments each pair of which are linked by one divalent radical.

The term "fluid" as used herein indicates that a material is capable of flowing like a liquid. As used in this application, the term "clear" in reference to a polymerizable composition means that the polymerizable composition is a transparent solution or liquid mixture (i.e., having a light transmissibility of 85% or greater, preferably 90% or greater in the range between 400 to 700 nm).

The term "monovalent radical" refers to an organic radical that is obtained by removing a hydrogen atom from an organic compound and that forms one bond with one other group in an organic compound. Examples include without limitation, alkyl (by removal of a hydrogen atom from an alkane), alkoxy (or alkoxyl) (by removal of one hydrogen atom from the hydroxyl group of an alkyl alcohol), thiyl (by removal of one hydrogen atom from the thiol group of an alkylthiol), cycloalkyl (by removal of a hydrogen atom from a cycloalkane), cycloheteroalkyl (by removal of a hydrogen atom from a cycloheteroalkane), aryl (by removal of a hydrogen atom from an aromatic ring of the aromatic hydrocarbon), heteroaryl (by removal of a hydrogen atom from any ring atom), amino (by removal of one hydrogen atom from an amine), etc.

The term "divalent radical" refers to an organic radical that is obtained by removing two hydrogen atoms from an organic compound and that forms two bonds with other two groups in an organic compound. For example, an alkylene divalent radical (i.e., alkylenyl) is obtained by removal of two hydrogen atoms from an alkane, a cycloalkylene divalent radical (i.e., cycloalkylenyl) is obtained by removal of two hydrogen atoms from the cyclic ring.

In this application, the term "substituted" in reference to an alkyl or an alkylenyl means that the alkyl or the alkylenyl comprises at least one substituent which replaces one hydrogen atom of the alkyl or the alkylenyl and is selected from the group consisting of hydroxyl (—OH), carboxyl (—COOH), —NH$_2$, sulfhydryl (—SH), $C_1$-$C_4$ alkyl, $C_1$-$C_4$ alkoxy, $C_1$-$C_4$ alkylthio (alkyl sulfide), $C_1$-$C_4$ acylamino, $C_1$-$C_4$ alkylamino, di-$C_1$-$C_4$ alkylamino, and combinations thereof.

A free radical initiator can be either a photoinitiator or a thermal initiator. A "photoinitiator" refers to a chemical that initiates free radical crosslinking/polymerizing reaction by the use of light. A "thermal initiator" refers to a chemical that initiates free radical crosslinking/polymerizing reaction by the use of heat energy.

The intrinsic "oxygen permeability", $Dk_i$, of a material is the rate at which oxygen will pass through a material. As used in this application, the term "oxygen permeability (Dk)" in reference to a crosslinked polymeric material or an insert means a corrected oxygen permeability ($Dk_c$) which is measured at about 34-35° C. and corrected for the surface resistance to oxygen flux caused by the boundary layer effect according to the procedures described in Example 1. Oxygen permeability is conventionally expressed in units of barrers, where "barrer" is defined as [(cm$^3$ oxygen)(mm)/(cm$^2$)(sec)(mm Hg)]×10$^{-10}$.

The "oxygen transmissibility", Dk/t, of an insert or material is the rate at which oxygen will pass through a specific insert or material with an average thickness of t[in units of mm] over the area being measured. Oxygen transmissibility is conventionally expressed in units of barrers/mm, where "barrers/mm" is defined as [(cm$^3$ oxygen)/(cm$^2$)(sec)(mm Hg)]×10$^{-9}$.

The term "modulus" or "elastic modulus" in reference to a contact lens or a material means the tensile modulus or Young's modulus which is a measure of the stiffness of a contact lens or a material. The modulus can be measured according to the procedures described in Example 1.

An "unprocessed state" refers to an insert which is obtained by cast-molding of a polymerizable composition in a mold and has not been subjected to extraction and/or hydration post-molding processes (i.e., having not been in contact with water or any organic solvent or any liquid after molding).

A "male mold half" or "base curve mold half" interchangeably refers to a mold half having a molding surface that is a substantially convex surface and that defines the posterior surface of a contact lens or an insert.

A "female mold half" or "front curve mold half" interchangeably refers to a mold half having a molding surface that is a substantially concave surface and that defines the anterior surface of a contact lens or an insert.

The term "anterior surface", "front surface", "front curve surface" or "FC surface" in reference to a contact lens or an insert, as used in this application, interchangeably means a surface of the contact lens or insert that faces away from the eye during wear. The anterior surface (front surface) is typically substantially convex.

The "posterior surface", "back surface", "base curve surface" or "BC surface" in reference to a contact lens or insert, as used in this application, interchangeably means a surface of the contact lens or insert that faces towards the eye during wear. The posterior surface (back surface) is typically substantially concave.

In general, the invention is directed to an embedded hydrogel contact lenses, in particular, embedded silicone hydrogel contact lenses, which comprises an insert sandwiched between two layers of hydrogel materials.

FIG. 1 illustrates an embedded hydrogel contact lens according to a preferred embodiment of the invention. An embedded hydrogel contact lens 100 has an anterior surface 111, an opposite posterior surface 122, and a diameter 105 of from about 13.5 mm to about 15.5 mm. The embedded hydrogel contact lens 100 comprises an insert 150 sandwiched between the anterior layer 110 of a first hydrogel material and the posterior layer 120 of a second hydrogel material. The anterior layer 110 includes the anterior surface 111, and the posterior layer 120 includes the posterior surface 122. The insert 150 has a front surface (convex surface), an opposite back surface (concave surface), and a diameter 155 of less than about 13 mm.

Figure 2:
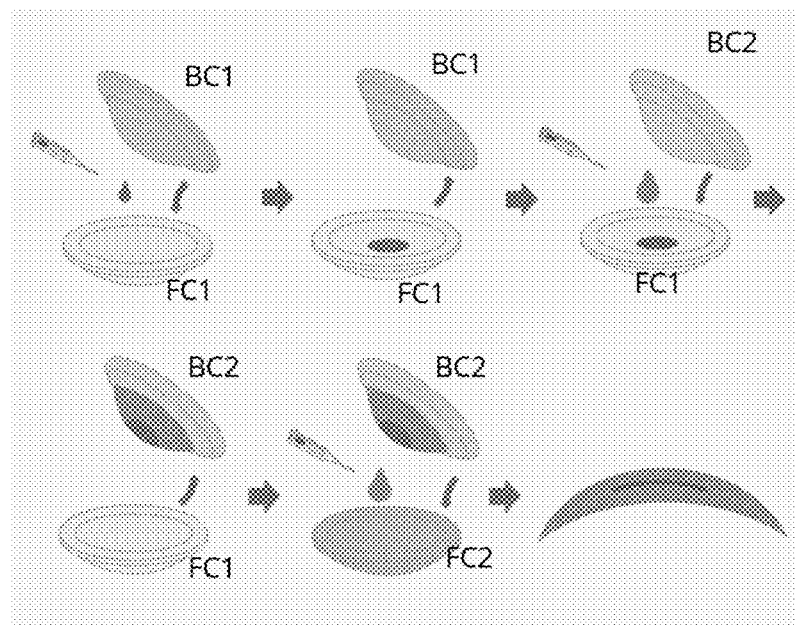
FIG. 2 schematically illustrates a method for making an embedded hydrogel contact lens according to a preferred embodiment of the invention.

The invention is partly based on the discovery that such an embedded hydrogel contact lens can be produced according to a cast molding method including the procedures illustrated in FIG. 2. Four mold halves, two females halves (FC1 and FC2) and two male halves (BC1 and BC2) are used. A method of the invention remove the needs for positioning guides (posts) for centrally positioning an insert during molding process. By eliminating positioning guides, any small voids in the lenses from the positioning guides are eliminated, thus removing any potential for bioburden trapping. Further, by using a method of the invention, one can producing an embedded hydrogel contact lens having an insert sandwiched between two layers of two different hydrogel materials having different softness, e.g., having a layer of a soft hydrogel material in contact with the cornea to provide an improved wearing comfort. In addition, a method of the invention can be easily implemented in an automatic product line for producing embedded hydrogel contact lenses in mass.

In some aspects, the invention provides a method for producing embedded hydrogel contact lenses, the method of invention comprising the steps of: (1) obtaining a first female mold half, a first male mold half, a second female mold half, and a second male mold half, wherein the first female mold half has a first molding surface having a central portion defining the front surface of a to-be-molded insert, wherein the first male mold half has a second molding surface defining the back surface of the to-be-molded insert, wherein the second female mold half has a third molding surface defining the anterior surface of an embedded hydrogel contact lens, wherein the second male mold half has a fourth molding surface defining the posterior surface of the embedded hydrogel contact lens, wherein the first female mold half and the first male mold half are configured to receive each other such that a first molding cavity is formed between the central portion of the first molding surface and the second molding surfaces when the first female and first male mold halves are closed securely, wherein the first female mold half and the second male mold half are configured to receive each other such that a second molding cavity is formed between the first and fourth molding surfaces when the first female mold half is closed with the second male mold half, wherein the second female mold half and the second male mold half are configured to receive each other such that a third molding cavity is formed between the third and fourth molding surfaces when the second female mold half is closed securely with the second male mold half; (2) dispensing an amount of an insert-forming composition on the central portion of the first molding surface of the first female mold half; (3) placing the first male mold half on top of the insert-forming composition in the first female mold half and closing the first male mold half and the first female mold half to form a first molding assembly comprising the insert-forming composition therein; (4) curing the insert-forming composition in the first molding assembly to form a molded insert that has the front surface defined by the central portion of the first molding surface and the back surface defined by the second molding surface; (5) separating the first molding assembly obtained in step (4) into the first male mold half and the first female mold half with the molded insert adhered onto the central portion of the first molding surface of the first female mold half; (6) dispensing an amount of a first lens-forming composition over the molded insert adhered on the central portion of the first molding surface in the first female mold half; (7) placing the second male mold half on top of the first female mold half and closing the second male mold half and the first female mold half to form a second molding assembly comprising the first lens-forming composition and the molded insert immersed therein in the second molding assembly; (8) curing the first lens-forming composition in the second molding assembly to form a lens precursor having a convex surface defined by the first molding surface and an opposite concave surface that is defined by the fourth molding surface and is the posterior surface of the embedded hydrogel contact lens, wherein the lens precursor comprise a first hydrogel material formed from the first lens-forming composition and the insert embedded in the first material in such a way that the front surface of the insert merges with the convex surface of the lens precursor while the back surface of the insert is buried beneath the concave surface of the lens precursor; (9) separating the second molding assembly obtained in step (8) into the second male mold half and the female mold half, with the lens precursor adhered on the second male mold half; (10) dispensing an amount of a second lens-forming composition on the third molding surface of the second female mold half; over the molded insert adhered on the central portion of the first molding surface in the first female mold half; (11) placing the second male mold half obtained in step (9) on top of the second female mold half and closing the second male mold half and the second female mold half to form a third molding assembly comprising the second lens-forming composition and the lens precursor immersed therein in the third molding assembly; (12) curing the second lens-forming composition in the third molding assembly to form an embedded hydrogel contact lens that comprises the insert sandwiched between the first hydrogel material and a second hydrogel material formed from the second lens-forming composition; (13) separating the third molding assembly obtained in step (12) into the second male mold half and the second female mold half, with the embedded hydrogel contact lens adhered on one of the second male mold half and the second female mold half; (14) removing the embedded hydrogel contact lens from the lens-adhered mold half (preferably before the embedded hydrogel contact lens is contact with water or any liquid); and (15) subjecting the embedded hydrogel contact lens to post-molding processes including a hydration process and one or more other processes selected from the group consisting of extraction, surface treatment, packaging, sterilization, and combinations thereof.

In other aspects, the invention provides an embedded hydrogel contact lens, comprising: an anterior surface, an opposite posterior surface, a diameter of from about 13.5 mm to about 15.5 mm and an insert which is sandwiched by one anterior layer of a first hydrogel material and one posterior layer of a second hydrogel material, wherein the anterior layer includes the anterior surface and the posterior layer includes the posterior surface, wherein the insert is made of a crosslinked polymeric material and has a front surface, an opposite back surface and a diameter of less than 13.0 mm, wherein the insert is located in a central portion of the embedded hydrogel contact lens, wherein the anterior layer and the posterior layer independent of each other have a center thickness of at least about 15 microns, wherein the first and second hydrogel material is identical to each other or different from each other, wherein the embedded hydrogel contact lens is not susceptible to delamination as demonstrated by being free of bubble that can be observed under microscopy at interfaces between the insert and the bulk material within the embedded silicone hydrogel contact lens after being autoclaved in a packaging solution in a sealed package, wherein the packaging solution is a buffered saline having a pH of $7.1 \pm 0.2$.

Mold halves for making contact lenses (or inserts) are well known to a person skilled in the art and, for example, are employed in cast molding. In general, a molding assembly comprises at least two mold halves, one male half and one female mold half. The male mold half has a first molding (or optical) surface which is in direct contact with a polymerizable composition for cast molding of a contact lens (or an insert) and defines the posterior (back) surface of a molded contact lens (or a molded insert); and the female mold half has a second molding (or optical) surface which is in direct contact with the polymerizable composition and defines the anterior (front) surface of the molded contact lens (or molded insert). The male and female mold halves are configured to receive each other such that a lens- or insert-forming cavity is formed between the first molding surface and the second molding surface.

Methods of manufacturing mold halves for cast-molding a contact lens or an insert are generally well known to those of ordinary skill in the art. The process of the present invention is not limited to any particular method of forming a mold half. In fact, any method of forming a mold half can be used in the present invention. The mold halves can be formed through various techniques, such as injection molding or lathing. Examples of suitable processes for forming the mold halves are disclosed in U.S. Pat. Nos. 4,444,711; 4,460,534; 5,843,346; and 5,894,002.

Virtually all materials known in the art for making mold halves can be used to make mold halves for making contact lenses or inserts. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, N.J.), or the like can be used.

In accordance with the invention, the insert-forming composition and the first and second lens-forming compositions are polymerizable compositions. The insert-forming composition is different from the first and second lens-forming compositions. They can differ from each other in the presence or absence of one or more polymerizable components, in the amounts of one or more polymerizable components, and/or in the presence or absence of one or more non-leachable additives for providing different optical properties (e.g., photochromic dyes or pigments, UV-absorbing materials, HEVL-absorbing materials, fluorescent dyes or pigments, color-filtering materials for correcting color blindness, diffractive materials, high refractive-index materials, etc.).

Any polymerizable compositions, such as those known to be suitable for making hard, soft, non-silicone hydrogel, and silicone hydrogel contact lenses and for making intraocular lenses, can be used as insert-forming composition.

In a preferred embodiment, an insert is made of a hard plastics (preferably a crosslinked polymethylmethacrylate).

In another preferred embodiment, an insert is made of a crosslinked silicone polymer (or a silicone rubber or elastomer as known to a person skilled in the art). A crosslinked silicone material has three-dimensional polymer networks (i.e., polymer matrix), is insoluble in water, and has an equilibrium water content of about 5% or less, preferably about 3% or less, more preferably about 2% or less) by weight (i.e., in fully-hydrated state).

In another preferred embodiment, an insert is made of a non-silicone hydrogel material (any one of those described later in this application).

In another preferred embodiment, an insert is made of a silicone hydrogel material (any one of those described later in this application).

In another preferred embodiment, an insert is made of a rigid gas permeable material (e.g., a material made from fluorosilicone acrylates).

In another preferred embodiment, an insert comprises repeating units of at least one polymerizable photochromic compound (i.e., at least one photochromic vinylic monomer), at least one UV-absorbing vinylic monomer, at least one UV/HEVL-absorbing vinylic monomer, a fluorescent vinylic monomer, or combinations thereof.

In another preferred embodiment, an insert comprises at least one photochromic dye or pigment, at least one color-filtering material for correcting color blindness, a diffractive material, a high refractive-index material, or combinations.

In another preferred embodiment, an insert is made of a hydrophobic crosslinked acrylic material that has an equilibrium water content of less than 5% by weight and comprises at least about 55% (preferably at least about 60%, more preferably at least about 65% even more preferably at least about 70%) by mole of repeating units of one or more acrylic monomers and/or one or more acrylic crosslinker or crosslinking agent and at least about 6% by mole (preferably at least about 8% by mole, more preferably at least about 10% by mole, even more preferably at least about 12% by mole) of repeating units at least one vinylic crosslinking agent.

Any hydrophobic acrylic monomers can be used in forming a rigid hydrophobic insert of the inventions. Examples of hydrophobic acrylic monomers includes silicone-containing acrylic monomers (any one of those described below in this application), non-silicone hydrophobic acrylic monomers (any one of those described below in this application), fluorine-containing acrylic monomers (any one of those described below in this application), aryl acrylic monomers as described below, and combinations thereof.

In accordance with a preferred embodiment of the invention, the crosslinked polymeric material of the rigid hydrophobic insert comprises an aryl vinylic monomer of formula (I) or (II)

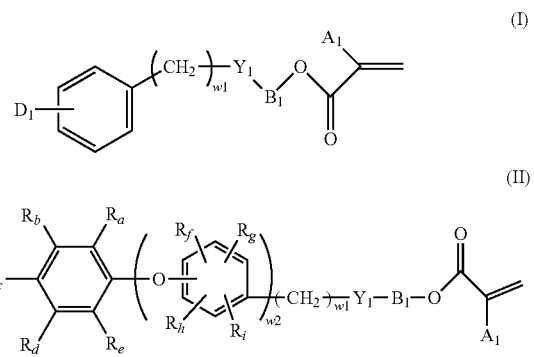

wherein $A_1$ is H or $CH_3$ (preferably H); $B_1$ is $(CH_2)_{m1}$ or $[O(CH_2)_2]_{z1}$ in which m1 is 2-6 and z1 is 1-10; $Y_1$ is a direct bond, O, S, or NR' in which R' is H, $CH_3$, $C_nH_{2n'+1}$ in which n'=1-10, iso-$OC_3H_7$, $C_6H_5$, or $CH_2C_6H_5$; $R_a$, $R_b$, $R_c$, $R_d$, $R_e$, $R_f$, $R_g$, $R_h$, and $R_i$ independent of one another are H, $C_1$-$C_{12}$ alkyl, or $C_1$-$C_{12}$ alkoxy (preferably all are H); w1 is 0-6, provided that m1+w1≤8; w2 is an integer from 1 to 3; and $D_1$ is H, Cl, Br, $C_1$-$C_4$ alkyl, $C_1$-$C_4$ alkoxy, $C_6H_5$, or $CH_2C_6H_5$.

Examples of aryl acrylic monomers of formula (I) include, but are not limited to those described later in this application. Aryl acrylic monomers of formula (I) can be obtained from commercial sources or alternatively prepared according to methods known in the art.

Preferred aryl acrylic monomers of formula (I) are those wherein $B_1$ is $OCH_2CH_2$, $(OCH_2CH_2)_2$, $(OCH_2CH_2)_3$, or $(CH_2)_{m1}$ in which m1 is 2-5, $Y_1$ is a direct bond or O, w1 is 0 or 1, and $D_1$ is H. Most preferred are 2-phenylethyl acrylate; 3-phenylpropyl acrylate; 4-phenylbutyl acrylate; 5-phenylpentyl acrylate; 2-benzyloxyethyl acrylate; 3-benzyloxypropyl acrylate; 2-[2-(benzyloxy)ethoxy]ethyl acrylate; and their corresponding methacrylates.

Aryl acrylic monomers of formula (II) can be prepared from monofunctional polyphenyl ethers (i.e., ones with one functional group such as hydroxyl, amino, or carboxyl groups). Generally, a monofunctional OH-terminated poly(phenyl ether) is reacted with a (meth)acrylic acid derivative (such as acryloyl chloride, methacryloyl chloride, methacrylic anhydride, or an isocyanatoalkyl acrylate or methacrylate) under coupling reaction conditions known to a person skilled in the art. Mono-amine and mono-carboxylic acid terminated polyphenyl ethers are functionalized in a similar manner using suitable (meth)acrylic acid derivatives. Monofunctional terminated polyphenyl ethers can be prepared according to procedures described in literature (*J. Org. Chem.*, 1960, 25 (9), pp 1590-1595). The experiment procedures for preparing aryl acrylic monomers of formula (II) can be found in U.S. patent Ser. No. 10/064,977.

It is also understood that any hydrophobic vinylic monomer can be used as a substitute for a hydrophobic acrylic monomer, so long as it comprises at least one H-bond acceptor such as ester bond, amide bond, carbonate bond, carbamate bond, ether bond, or combinations thereof. Examples of such hydrophobic monomers include vinyl alkanoates (any one of those described above in this application), vinyloxyalkanes (any one of those described above in this application), and combinations thereof.

It is understood that the mole percentages of each of the components of the crosslinked polymeric material of an insert of the invention can be obtained based on the mole percentages of its corresponding polymerizable component (material) in a polymerizable composition for making the insert.

In accordance with the invention, a hydrophobic crosslinked acrylic material comprises repeating units of at least one vinylic crosslinking agent. Any suitable vinyl crosslinking agents can be used in the invention. Examples of preferred vinylic cross-linking agents include without limitation: acrylic crosslinking agents (crosslinkers) (any one of those described later in this application), allyl methacrylate, allyl acrylate, an aryl crosslinking agent (e.g., divinylbenzene, 2-methyl-1,4-divinylbenzene, bis(4-vinylphenyl)methane, 1,2-bis(4-vinylphenyl)ethane, etc.), triallyl isocyanurate, 2,4,6-triallyloxy-1,3,5-triazine, 1,2,4-trivinylcyclohexane, or combinations thereof. It is understood that vinylic crosslinking agents are required for imparting the desired rigidity to the crosslinked polymeric material of the rigid hydrophobic insert.

In a preferred embodiment, the hydrophobic crosslinked acrylic material comprises repeating units of at least one acrylic crosslinking agent (any one of those described later in this application).

In another preferred embodiment, the hydrophobic crosslinked acrylic material comprises repeating units of at least one aryl crosslinking agent (any one of those described later in this application).

In another preferred embodiment, the hydrophobic crosslinked acrylic material comprises repeating units of at least one vinyl-functional polysiloxane that comprises at least two vinyl groups each directly attached to one silicon atom and at least 15% by mole of siloxane units each having at least one phenyl substituent.

Examples of such vinyl functional polysiloxanes include without limitation vinyl terminated polyphenylmethysiloxanes (e.g., PMV9925 from Gelest), vinylphenylmethyl terminated phenylmethyl-vinylphenylsiloxane copolymer (e.g., PVV-3522 from Gelest), vinyl terminated diphenylsiloxane-dimethylsiloxane copolymers (e.g., PDV-1625 from Gelest), or combinations thereof. Preferably, the vinyl-functional polysiloxane is vinyl terminated polyphenylmethysiloxanes (e.g., PMV9925 from Gelest), vinylphenylmethyl terminated phenylmethyl-vinylphenylsiloxane copolymer (e.g., PVV-3522 from Gelest), or combinations thereof.

An insert-forming composition can be prepared by mixing all polymerizable materials as described above in the desired proportions, together with one or more polymerization initiators (thermal polymerization initiators or photoinitiators) in the presence or preferably in the absence of a non-reactive organic solvent (i.e., a non-reactive diluent) as described later in this application.

Any thermal polymerization initiators can be used in the invention. Suitable thermal polymerization initiators are known to the skilled artisan and comprise, for example peroxides, hydroperoxides, azo-bis(alkyl- or cycloalkylnitriles), persulfates, percarbonates, or mixtures thereof. Examples of preferred thermal polymerization initiators include without limitation benzoyl peroxide, t-butyl peroxide, t-amyl peroxybenzoate, 2,2-bis(tert-butylperoxy)butane, 1,1-bis(tert-butylperoxy)cyclohexane, 2,5-Bis(tert-butylperoxy)-2,5-dimethylhexane, 2,5-bis(tert-butylperoxy)-2,5-dimethyl-3-hexyne, bis(1-(tert-butylperoxy)-1-methylethyl)benzene, 1,1-bis(tert-butylperoxy)-3,3,5-trimethylcyclohexane, di-t-butyl-diperoxyphthalate, t-butyl hydro-peroxide, t-butyl peracetate, t-butyl peroxybenzoate, t-butylperoxy isopropyl carbonate, acetyl peroxide, lauroyl peroxide, decanoyl peroxide, dicetyl peroxydicarbonate, di(4-t-butylcyclohexyl) peroxy dicarbonate (Perkadox 16S), di(2-ethylhexyl)peroxy dicarbonate, t-butylperoxy pivalate (Lupersol 11); t-butylperoxy-2-ethylhexanoate (Trigonox 21-050), 2,4-pentanedione peroxide, dicumyl peroxide, peracetic acid, potassium persulfate, sodium persulfate, ammonium persulfate, 2,2'-azobis(4-methoxy-2,4-dimethylvaleronitrile) (VAZO 33), 2,2'-Azobis[2-(2-imidazolin-2-yl)propane]dihydrochloride (VAZO 44), 2,2'-azobis(2-amidinopropane) dihydrochloride (VAZO 50), 2,2'-azobis(2,4-dimethylvaleronitrile) (VAZO 52), 2,2'-azobis(isobutyronitrile) (VAZO 64 or AIBN), 2,2'-azobis-2-methylbutyronitrile (VAZO 67), 1,1-azobis(1-cyclohexanecarbonitrile) (VAZO 88); 2,2'-azobis(2-cyclopropylpropionitrile), 2,2'-azobis(methylisobutyrate), 4,4'-Azobis(4-cyanovaleric acid), and combinations thereof. Preferably, the thermal initiator is 2,2'-azobis(isobutyronitrile) (AIBN or VAZO 64).

Suitable photoinitiators are benzoin methyl ether, diethoxyacetophenone, a benzoylphosphine oxide, 1-hydroxycyclohexyl phenyl ketone and Darocur and Irgacur types, preferably Darocur 1173® and Darocur 2959®, Germanium-based Norrish Type I photoinitiators (e.g., those described in U.S. Pat. No. 7,605,190). Examples of benzoylphosphine initiators include 2,4,6-trimethylbenzoyldiphenylophosphine oxide; bis-(2,6-dichlorobenzoyl)-4-N-propylphenylphosphine oxide; and bis-(2,6-dichlorobenzoyl)-4-N-butylphenylphosphine oxide. Reactive photoinitiators which can be incorporated, for example, into a macromer or can be used as a special monomer are also suitable. Examples of reactive photoinitiators are those disclosed in EP 632 329.

In accordance with the invention, the first hydrogel material formed from the first lens-forming composition and the second hydrogel material formed from the second lens-forming composition independent of each other are a non-silicone hydrogel material (any one of those described later in this application) or preferably a silicone hydrogel material (any one of those described later in this application).

In a preferred embodiment, the first and second hydrogel materials are identical to each other, namely formed from an identical lens-forming composition.

In another preferred embodiment, the first and second hydrogel materials are different from each other.

In another preferred embodiment, the second hydrogel material is softer than the first hydrogel material as measured by having a ratio of indentation depth ratio, $$\frac{(Id)_{PS}}{(Id)_{AS}},$$

of at least about 1.2 (preferably at least about 1.3, more preferably at least about 1.4, even more preferably at least about 1.5, most preferably at least about 1.6), wherein $(Id)_{PS}$ is the indentation depth measured with a indenting probe having a tip radius of 9.5 µm and a stiffness of 0.54 N/m at 5 KPa compression pressure against the posterior surface in a nanoindentation test, wherein $(id)_{AS}$ is the indentation depth measured with a indenting probe having a tip radius of 9.5 µm and a stiffness of 0.54 N/m at 5 KPa compression pressure against the anterior surface in a nanoindentation test.

The 5 kPa compression pressure is used to simulate eyelid pressure, typically between 1-5 kPa. Other probe tip radii or cantilever stiffness could be used, depending upon the surface softness. Stiffer probes could be used for stiffer materials.

It is understood that an indentation depth at 5 KPa compression pressure of an indenting probe having a tip radius of 9.5 µm and a stiffness of 0.54 N/m in a nanoindentation test (as described in Example 1) can be a good measure for the elastic modulus of a hydrogel material at one of its surface of an embedded hydrogel contact lens). The higher the elastic modulus of a hydrogel material is, the smaller the indentation depth is.

As known to a person skilled in the art, the surface modulus of a hydrogel correlates with the mesh size of the hydrogel, because the mesh size of the hydrogel is inversely proportional to the crosslinking density of the hydrogel while being proportional to the lengths of crosslinking chains (see, U.S. Pat. No. 2018/0030209). Due to the correlation between the mesh size and the equilibrium water content of a hydrogel, the surface modulus of a hydrogel can inversely correlate with the equilibrium water content of that hydrogel. The higher the surface modulus of a hydrogel is, the lower the equilibrium water content is. Consequently, the larger an indentation depth at 5 KPa is, the lower the elastic modulus of the outer surface hydrogel layer on a contact lens at one of its surface is. Therefore, the indentation depth at 5 KPa compression pressure (or any fixed compression pressure) of a contact lens at one of its surface can also be a good indicator for the equilibrium water content of the first or second hydrogel material in an embedded hydrogel contact lens of the invention.

The posterior surface of a contact lens of the invention, which is in direct contact with the cornea and its softness, is much softer than the anterior surface and has more impact upon the wearing comfort.

A person skilled in the art knows how to make a softer hydrogel material by controlling to the crosslinking density and/or the lengths of crosslinking chains of the hydrogel material, i.e., selecting one or more vinylic crosslinkers and their concentrations in a lens-forming composition.

A non-silicone hydrogel material can be formed from a polymerizable composition (such as one for forming a non-silicone hydrogel contact lens). Typically, a polymerizable composition for forming a non-silicone hydrogel material is either (1) a monomer mixture comprising (a) at least one hydrophilic vinylic monomer (e.g., hydroxyl-containing vinylic monomer, N-vinylpyrrolidone, or combinations thereof) and (b) at least one component selected from the group consisting of a crosslinking agent, a hydrophobic vinylic monomer, a free-radical initiator (photoinitiator or thermal initiator), a UV-absorbing vinylic monomer, a high-energy-violet-light ("HEVL") absorbing vinylic monomer, a visibility tinting agent, and combinations thereof; or (2) an aqueous solution comprising one or more water-soluble prepolymers and at least one component selected from the group consisting of hydrophilic vinylic monomer, a crosslinking agent, a hydrophobic vinylic monomer, a lubricating agent (or so-called internal wetting agents incorporated in a lens formulation), a free-radical initiator (photoinitiator or thermal initiator), a UV-absorbing vinylic monomer, a HEVL absorbing vinylic monomer, a visibility tinting agent, and combinations thereof.

Examples of water-soluble prepolymers include without limitation: a water-soluble crosslinkable poly(vinyl alcohol) prepolymer described in U.S. Pat. Nos. 5,583,163 and 6,303,687; a water-soluble vinyl group-terminated polyurethane prepolymer described in U.S. Pat. No. 6,995,192; derivatives of a polyvinyl alcohol, polyethyleneimine or polyvinylamine, which are disclosed in U.S. Pat. No. 5,849,841; a water-soluble crosslinkable polyurea prepolymer described in U.S. Pat. Nos. 6,479,587 and 7,977,430; crosslinkable polyacrylamide; crosslinkable statistical copolymers of vinyl lactam, MMA and a comonomer, which are disclosed in U.S. Pat. No. 5,712,356; crosslinkable copolymers of vinyl lactam, vinyl acetate and vinyl alcohol, which are disclosed in U.S. Pat. No. 5,665,840; polyether-polyester copolymers with crosslinkable side chains which are disclosed in U.S. Pat. No. 6,492,478; branched polyalkylene glycol-urethane prepolymers disclosed in U.S. Pat. No. 6,165,408; polyalkylene glycol-tetra(meth)acrylate prepolymers disclosed in U.S. Pat. No. 6,221,303; crosslinkable polyallylamine gluconolactone prepolymers disclosed in U.S. Pat. No. 6,472,489.

Numerous polymerizable compositions for forming non-silicone hydrogel materials have been described in numerous patents and patent applications published by the filing date of this application and have been used in producing commercial non-silicone hydrogel contact lenses. Examples of commercial non-silicone hydrogel contact lenses include, without limitation, alfafilcon A, acofilcon A, deltafilcon A, etafilcon A, focofilcon A, helfilcon A, helfilcon B, hilafilcon B, hioxifilcon A, hioxifilcon B, hioxifilcon D, methafilcon A, methafilcon B, nelfilcon A, nesofilcon A, ocufilcon A, ocufilcon B, ocufilcon C, ocufilcon D, omafilcon A, phemfilcon A, polymacon, samfilcon A, telfilcon A, tetrafilcon A, and vifilcon A. They can be used as a lens-forming composition of the invention.

Preferably, a non-silicone hydrogel material comprises at least 50% by mole of repeating units of at least one hydroxyl-containing vinylic monomer, preferably selected from the group consisting of hydroxyethyl (meth)acrylate, glycerol (meth)acrylate, 3-hydroxypropyl (meth)acrylate, 2-hydroxypropyl (meth)acrylate, 3-amino-2-hydroxypropyl (meth)acrylate, N-2-hydroxyethyl (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth)acrylamide, vinyl alcohol, allyl alcohol, and combinations thereof, more preferably selected from the group consisting of hydroxyethyl (meth)acrylate, glycerol (meth)acrylate, and vinyl alcohol.

A silicone hydrogel material can be formed from a polymerizable composition (such as one for forming a silicone hydrogel contact lens). Numerous polymerizable compositions for forming silicone hydrogel materials have been described in numerous patents and patent applications published by the filing date of this application and have been used in producing commercial SiHy contact lenses. Examples of commercial SiHy contact lenses include, without limitation, asmofilcon A, balafilcon A, comfilcon A, delefilcon A, efrofilcon A, enfilcon A, fanfilcon A, galyfilcon A, lotrafilcon A, lotrafilcon B, narafilcon A, narafilcon B, senofilcon A, senofilcon B, senofilcon C, smafilcon A, somofilcon A, and stenfilcon A. They can be used as a lens-forming composition of the invention.

Preferably, a silicone hydrogel material comprises (a) repeating units of at least one first polysiloxane vinylic crosslinker comprising hydrophilized siloxane units each having one methyl substituent and one organic radical including at least one H-bond donor (preferably hydroxyl groups) and (b) repeating units of at least one hydrophilic vinylic monomer, wherein the content of said at least one H-bond donor is at least about 0.8 meq/g (preferably at least about 1.0 meq/g, more preferably at least about 1.2 meq/g, even more preferably at least about 1.4 meq/g) relative to the molecular weight of said at least one first polysiloxane vinylic crosslinker.

In accordance with the invention, any polysiloxane vinylic crosslinkes can be used in the invention as the first polysiloxane vinylic crosslinkers, so long as they comprises hydrophilized siloxane units each having one methyl substituent and one organic radical having at least one H-bond donor (preferably hydoxyl group). Examples of a class of preferred polysiloxane vinylic crosslinkers are di-(meth)acryloyloxy-terminated polysiloxane vinylic crosslinkers each having dimethylsiloxane units and hydrophilized siloxane units each having one methyl substituent and one monovalent $C_4$-$C_{40}$ organic radical substituent having 2 to 6 hydroxyl groups, more preferably a polysiloxane vinylic crosslinker of formula (G), as described later in this application. They can be prepared according to the procedures disclosed in U.S. patent Ser. No. 10/081,697.

Any hydrophilic vinylic monomers can be used in the invention. Examples of preferred hydrophilic vinylic monomers are alkyl (meth)acrylamides (as described later in this application), hydroxyl-containing acrylic monomers (as described below), amino-containing acrylic monomers (as described later in this application), carboxyl-containing acrylic monomers (as described later in this application), N-vinyl amide monomers (as described later in this application), methylene-containing pyrrolidone monomers (i.e., pyrrolidone derivatives each having a methylene group connected to the pyrrolidone ring at 3- or 5-position) (as described later in this application), acrylic monomers having a $C_1$-$C_4$ alkoxyethoxy group (as described later in this application), vinyl ether monomers (as described later in this application), allyl ether monomers (as described later in this application), phosphorylcholine-containing vinylic monomers(as described later in this application), N-2-hydroxyethyl vinyl carbamate, N-carboxyvinyl-β-alanine (VINAL), N-carboxyvinyl-α-alanine, and combinations thereof.

In accordance with the invention, a silicone hydrogel material can further comprise repeating units of a silicone-containing vinylic monomer and/or a second polysiloxane vinylic crosslinker (other than the first polysiloxane vinylic crosslinker).

In accordance with the invention, a silicone-containing vinylic monomer can be any silicone-containing vinylic monomer known to a person skilled in the art. Examples of preferred silicone-containing vinylic monomers include without limitation vinylic monomers each having a bis (trialkylsilyloxy)alkylsilyl group or a tris(trialkylsilyloxy) silyl group, polysiloxane vinylic monomers, 3-methacryloxy propyl pentamethyldisiloxane, t-butyldimethyl-siloxyethyl vinyl carbonate, trimethylsilylethyl vinyl carbonate, and trimethylsilylmethyl vinyl carbonate, and combinations thereof.

Preferred polysiloxanes vinylic monomers including those of formula (M1) are described later in this application and can be obtained from commercial suppliers (e.g., Shin-Etsu, Gelest, etc.); prepared according to procedures described in patents, e.g., U.S. Pat. Nos. 5,070,215, 6,166, 236, 6,867,245, 8,415,405, 8,475,529, 8,614,261, and 9,217, 813; prepared by reacting a hydroxyalkyl (meth)acrylate or (meth)acrylamide or a (meth)acryloxypolyethylene glycol with a mono-epoxypropyloxypropyl-terminated polydimethylsiloxane; prepared by reacting glycidyl (meth)acrylate with a mono-carbinol-terminated polydimethylsiloxane, a mono-aminopropyl-terminated polydimethylsiloxane, or a mono-ethylaminopropyl-terminated polydimethylsiloxane; or prepared by reacting isocyanatoethyl (meth)acrylate with a mono-carbinol-terminated polydimethylsiloxane according to coupling reactions well known to a person skilled in the art.

Preferred silicone-containing vinylic monomers each having a bis(trialkylsilyloxy)alkylsilyl group or a tris(trialkylsilyloxy)silyl group, including those of formula (M2), are described later in this application and can be obtained from commercial suppliers (e.g., Shin-Etsu, Gelest, etc.) or can be prepared according to procedures described in U.S. Pat. Nos. 5,070,215, 6,166,236, 7,214,809, 8,475,529, 8,658,748, 9,097,840, 9,103,965, and 9,475,827.

Any suitable polysiloxane vinylic crosslinkers can be used in the invention as the second polysiloxane vinylic crosslinkers. Examples of preferred polysiloxane vinylic crosslinkers as the second polysiloxane vinylic crosslinker are di-(meth)acryloyl-terminated polydimethyl-siloxanes; di-vinyl carbonate-terminated polydimethylsiloxanes; di-vinyl carbamate-terminated polydimethylsiloxane; N, N, N',N'-tetrakis(3-methacryloxy-2-hydroxypropyl)-alpha, omega-bis-3-aminopropyl-polydimethylsiloxane; polysiloxane-containing macromer selected from the group consisting of Macromer A, Macromer B, Macromer C, and Macromer D described in U.S. Pat. No. 5,760,100; polysiloxane-containing macromers disclosed in U.S. Pat. Nos. 4,136,250, 4,153,641, 4,182,822, 4,189,546, 4,343,927, 4,254,248, 4,355,147, 4,276,402, 4,327,203, 4,341,889, 4,486,577, 4,543,398, 4,605,712, 4,661,575, 4,684,538, 4,703,097, 4,833,218, 4,837,289, 4,954,586, 4,954,587, 5,010,141, 5,034,461, 5,070,170, 5,079,319, 5,039,761, 5,346,946, 5,358,995, 5,387,632, 5,416,132, 5,451,617, 5,486,579, 5,962,548, 5,981,675, 6,039,913, and 6,762,264; polysiloxane-containing macromers disclosed in U.S. Pat. Nos. 4,259,467, 4,260,725, and 4,261,875.

One class of preferred polysiloxane vinylic crosslinkers as the second polysiloxane vinylic crosslinker are vinylic crosslinkers each of which comprises one sole polydiorganosiloxane segment and two terminal (meth)acryloyl groups, which can be obtained from commercial suppliers; prepared by reacting glycidyl (meth)acrylate (meth)acryloyl chloride with a di-amino-terminated polydimethylsiloxane or a di-hydroxyl-terminated polydimethylsiloxane; prepared by reacting isocyantoethyl (meth)acrylate with di-hydroxyl-terminated polydimethylsiloxanes prepared by reacting an amino-containing acrylic monomer with di-carboxyl-terminated polydimethylsiloxane in the presence of a coupling agent (a carbodiimide); prepared by reacting a carboxyl-containing acrylic monomer with di-amino-terminated polydimethylsiloxane in the presence of a coupling agent (a carbodiimide); or prepared by reacting a hydroxyl-containing acrylic monomer with a di-hydroxy-terminated polydisiloxane in the presence of a diisocyanate or di-epoxy coupling agent.

Other classes of preferred polysiloxane vinylic crosslinkers as the second polysiloxane vinylic crosslinker are chain-extended polysiloxane vinylic crosslinkers each of which has at least two polydiorganosiloxane segments linked by a linker between each pair of polydiorganosiloxane segments and tweo terminal ethylenically unsaturated groups, which can be prepared according to the procedures described in U.S. Pat. Nos. 5,034,461, 5,416,132, 5,449,729, 5,760,100, 7,423,074, 8,529,057, 8,835,525, 8,993,651, 10,301,451, and 10,465,047.

In accordance with the invention, a silicone hydrogel material can also comprise repeating units of one or more hydrophobic non-silicone vinylic monomers. Examples of preferred hydrophobic non-silicone vinylic monomers can be non-silicone hydrophobic acrylic monomers (methyl (meth)acrylate, ethyl (meth)acrylate, propyl (meth)acrylate, isopropyl (meth)acrylate, cyclohexyl (meth)acrylate, 2-ethylhexyl (meth)acrylate, isobornyl (meth)acrylate, (meth) acrylonitrile, etc.), fluorine-containing acrylic monomers (e.g., perfluorohexylethyl-thio-carbonyl-aminoethyl-methacrylate, perfluoro-substituted-$C_2$-$C_{12}$ alkyl (meth)acrylates described below, etc.), vinyl alkanoates (e.g., vinyl acetate, vinyl propionate, vinyl butyrate, vinyl valerate, etc.), vinyloxyalkanes (e.g., vinyl ethyl ether, propyl vinyl ether, n-butyl vinyl ether, isoputyl vinyl ether, cyclohexyl vinyl ether, t-butyl vinyl ether, etc.), styrene, vinyl toluene, vinyl chloride, vinylidene chloride, 1-butene, and combinations thereof.

Any suitable perfluoro-substituted-$C_2$-$C_{12}$ alkyl (meth) acrylates can be used in the invention. Examples of perfluoro-substituted-$C_2$-$C_{12}$ alkyl (meth)acrylates include without limitation 2,2,2-trifluoroethyl (meth)acrylate, tetrafluoropropyl (meth)acrylate, hexafluoro-iso-propyl (meth) acrylate, hexafluorobutyl (meth)acrylate, heptafluorobutyl (meth)acrylate, octafluoropentyl (meth)acrylate, heptadecafluorodecyl (meth)acrylate, pentafluorophenyl (meth) acrylate, and combinations thereof.

In accordance with the invention, a silicone hydrogel material can also comprise repeating units of one or more non-silicone vinylic crosslinkers. Examples of preferred non-silicone vinylic cross-linking agents are described later in this application.

In accordance with the invention, a silicone hydrogel material can also comprises repeating units of other polymerizable materials, such as, a UV-absorbing vinylic monomer, a UV/high-energy-violet-light ("HEVL") absorbing vinylic monomer, polymerizable photochromic compound, a polymerizable tinting agent (polymerizable dye), or combinations thereof, as known to a person skilled in the art.

Any suitable UV-absorbing vinylic monomers and UV/HEVL-absorbing vinylic monomers can be used in a polymerizable composition for preparing a preformed SiHy contact lens of the invention. Examples of preferred UV-absorbing and UV/HEVL-absorbing vinylic monomers include without limitation: 2-(2-hydroxy-5-vinylphenyl)-2H-benzotriazole, 2-(2-hydroxy-5-acrylyloxyphenyl)-2H-benzotriazole, 2-(2-hydroxy-3-methacrylamido methyl-5-tert octylphenyl) benzotriazole, 2-(2'-hydroxy-5'-methacrylamidophenyl)-5-chlorobenzotriazole, 2-(2'-hydroxy-5'-methacrylamidophenyl)-5-methoxybenzotriazole, 2-(2'-hydroxy-5'-methacryloxypropyl-3'-t-butyl-phenyl)-5-chlorobenzotriazole, 2-(2'-hydroxy-5'-methacryloxypropylphenyl) benzotriazole, 2-hydroxy-5-methoxy-3-(5-(trifluoromethyl)-2H-benzo[d][1,2,3]triazol-2-yl)benzyl methacrylate (WL-1), 2-hydroxy-5-methoxy-3-(5-methoxy-2H-benzo[d][1,2,3]triazol-2-yl)benzyl methacrylate (WL-5), 3-(5-fluoro-2H-benzo[d][1,2,3]triazol-2-yl)-2-hydroxy-5-methoxybenzyl methacrylate (WL-2), 3-(2H-benzo[d][1,2,3]triazol-2-yl)-2-hydroxy-5-methoxybenzyl methacrylate (WL-3), 3-(5-chloro-2H-benzo[d][1,2,3]triazol-2-yl)-2-hydroxy-5-methoxybenzyl methacrylate (WL-4), 2-hydroxy-5-methoxy-3-(5-methyl-2H-benzo[d][1,2,3]triazol-2-yl) benzyl methacrylate (WL-6), 2-hydroxy-5-methyl-3-(5-(trifluoromethyl)-2H-benzo[d][1,2,3]triazol-2-yl)benzyl methacrylate (WL-7), 4-allyl-2-(5-chloro-2H-benzo[d][1,2, 3]triazol-2-yl)-6-methoxyphenol (WL-8), 2-{2'-Hydroxy-3'-tert-5-[3"-(4"-vinylbenzyloxy)propoxy]phenyl}-5-methoxy-2H-benzotriazole, phenol, 2-(5-chloro-2H-benzotriazol-2-yl)-6-(1,1-dimethylethyl)-4-ethenyl- (UVAM), 2-[2'-hydroxy-5'-(2-methacryloxyethyl)phenyl)]-2H-benzotriazole (2-Propenoic acid, 2-methyl-, 2-[3-(2H-benzotriazol-2-yl)-4-hydroxyphenyl]ethyl ester, Norbloc), 2-{2'-Hydroxy-3'-tert-butyl-5'-[3'-methacryloyloxypropoxy]phenyl}-2H-benzotriazole, 2-{2'-Hydroxy-3'-tert-butyl-5'-[3'-methacryloyloxypropoxy]phenyl}-5-methoxy-2H-benzotriazole (UV13), 2-{2'-Hydroxy-3'-tert-butyl-5'-[3'-methacryloyloxypropoxy]phenyl}-5-chloro-2H-benzotriazole (UV28), 2-[2'-hydroxy-3'-tert-butyl-5'-(3'-acryloyloxypropoxy)phenyl]-5-trifluoromethyl-2H-benzotriazole (UV23), 2-(2'-hydroxy-5-methacrylamidophenyl)-5-methoxybenzotriazole (UV6), 2-(3-allyl-2-hydroxy-5-methylphenyl)-2H-benzotriazole (UV9), 2-(2-Hydroxy-3-methallyl-5-methylphenyl)-2H-benzotriazole (UV12), 2-3'-t-butyl-2'-hydroxy-5'-(3"-dimethylvinylsilylpropoxy)-2'-hydroxy-phenyl)-5-methoxybenzotriazole (UV15), 2-(2'-hydroxy-5'-methacryloylpropyl-3'-tert-butyl-phenyl)-5-methoxy-2H-benzotriazole (UV16), 2-(2'-hydroxy-5'-acryloylpropyl-3'-tert-butyl-phenyl)-5-methoxy-2H-benzotriazole (UV16A), 2-Methylacrylic acid 3-[3-tert-butyl-5-(5-chlorobenzotriazol-2-yl)-4-hydroxyphenyl]-propyl ester (16-100, CAS #96478-15-8), 2-(3-(tert-butyl)-4-hydroxy-5-(5-methoxy-2H-benzo[d][1,2,3]triazol-2-yl)phenoxy)ethyl methacrylate (16-102); Phenol, 2-(5-chloro-2H-benzotriazol-2-yl)-6-methoxy-4-(2-propen-1-yl) (CAS #1260141-20-5); 2-[2-Hydroxy-5-[3-(methacryloyloxy)propyl]-3-tert-butylphenyl]-5-chloro-2H-benzotriazole; Phenol, 2-(5-ethenyl-2H-benzotriazol-2-yl)-4-methyl-, homopolymer (901) (CAS #83063-87-0). In accordance with the invention, the polymerizable composition comprises about 0.1% to about 3.0%, preferably about 0.2% to about 2.5%, more preferably about 0.3% to about 2.0%, by weight of one or more UV-absorbing vinylic monomers, related to the amount of all polymerizable components in the polymerizable composition.

Examples of preferred photochromic vinylic monomers include polymerizable naphthopyrans, polymerizable benzopyrans, polymerizable indenonaphthopyrans, polymerizable phenanthropyrans, polymerizable spiro(benzindoline)-naphthopyrans, polymerizable spiro(indoline)benzopyrans, polymerizable spiro(indoline)-naphthopyrans, polymerizable spiro(indoline)quinopyrans, polymerizable spiro(indoline)-pyrans, polymerizable naphthoxazines, polymerizable spirobenzopyrans; polymerizable spirobenzopyrans, polymerizable spirobenzothiopyrans, polymerizable naphthacenediones, polymerizable spirooxazines, polymerizable spiro (indoline)naphthoxazines, polymerizable spiro(indoline) pyridobenzoxazines, polymerizable spiro(benzindoline) pyridobenzoxazines, polymerizable spiro(benzindoline)

naphthoxazines, polymerizable spiro(indoline)-benzoxazines, polymerizable diarylethenes, and combinations thereof, as disclosed in U.S. Pat. Nos. 4,929,693, 5,166,345 6017121, 7556750, 7584630, 7999989, 8158037, 8697770, 8741188, 9052438, 9097916, 9465234, 9904074, 10197707, 6019914, 6113814, 6149841, 6296785, and 6348604.

In a preferred embodiment, a silicone hydrogel material comprises at least about 5% (preferably at least about 10%, more preferably at least about 15%, even more preferably at least about 20%, most preferably at least about 25%) by weight of repeating units of the first polysiloxane vinylic crosslinker.

In accordance with the invention, a silicone hydrogel material has an equilibrium water content (i.e., in fully hydrated state or when being fully hydrated) of from about 20% to about 70% (preferably from about 20% to about 65%, more preferably from about 25% to about 65%, even more preferably from about 30% to about 60%) by weight, an oxygen permeability of at least about 40 barrers (preferably at least about 60 barrers, more preferably at least about 80 barrers, more preferably at least about 100 barrers), and a modulus (i.e., Young's modulus) of about 1.5 MPa or less (preferably from about 0.2 MPa to about 1.2 MPa, more preferably from about 0.3 MPa to about 1.1 MPa, even more preferably from about 0.4 MPa to about 1.0 MPa).

A first or second lens-forming composition or an insert-forming composition can be a solventless clear liquid prepared by mixing all polymerizable components (or materials) and other necessary component(or materials) or a solution prepared by dissolving all of the desirable components (or materials) in any suitable solvent, such as, a mixture of water and one or more organic solvents miscible with water, an organic solvent, or a mixture of one or more organic solvents, as known to a person skilled in the art. The term "solvent" refers to a chemical that cannot participate in free-radical polymerization reaction (any of those solvents as described later in this application).

A solventless lens SiHy lens formulation (silicone hydrogel lens-forming composition) typically comprises at least one blending vinylic monomer as a reactive solvent for dissolving all other polymerizable components of the solventless SiHy lens formulation. Examples of preferred blending vinylic monomers are described later in this application. Preferably, methyl methacrylate is used as a blending vinylic monomer in preparing a solventless SiHy lens formulation.

Examples of suitable solvents include acetone, methanol, cyclohexane, tetrahydrofuran, tripropylene glycol methyl ether, dipropylene glycol methyl ether, ethylene glycol n-butyl ether, ketones (e.g., acetone, methyl ethyl ketone, etc.), diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimetyl ether, polyethylene glycols, polypropylene glycols, ethyl acetate, butyl acetate, amyl acetate, methyl lactate, ethyl lactate, i-propyl lactate, methylene chloride, 2-butanol, 1-propanol, 2-propanol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, tert-butanol, tert-amyl alcohol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3,4-trimethyl-3-pentanol, 3,7-dimethyl-3-octanol, 2-phenyl-2-butanol, 2-methyl-1-phenyl-2-propanol and 3-ethyl-3-pentanol, 1-ethoxy-2-propanol, 1-methyl-2-propanol, t-amyl alcohol, isopropanol, 1-methyl-2-pyrrolidone, N,N-dimethylpropionamide, dimethyl formamide, dimethyl acetamide, dimethyl propionamide, N-methyl pyrrolidinone, and mixtures thereof. More preferred organic solvents include without limitation methanol, ethanol, 1-propanol, isopropanol, sec-butanol, tert-butyl alcohol, tert-amyl alcohol, acetone, methyl ethyl ketone, methyl isopropyl ketone, methyl propyl ketone, ethyl acetate, heptane, methylhexane (various isomers), methylcyclohexane, di methylcyclopentane (various isomers), 2,2,4-trimethylpentane, and mixtures thereof.

The insert-forming composition and the first and second lens-forming composition can be introduced into a molding cavity according any techniques known in the art.

The curing of the insert-forming composition within the insert-molding cavity of the closed first molding assembly and the lens-forming composition within the molding cavity of the closed second or third molding assembly can be carried out thermally (i.e., by heating) or photochemically (i.e., by actinic radiation, e.g., UV radiation and/or visible radiation) to activate the polymerization initiators.

The actinic polymerization of the insert- or lens-forming composition in a molding assebly can be carried out by irradiating the closed molding assembly with the insert- or lens-forming composition therein with an UV or visible light, according to any techniques known to a person skilled in the art.

The thermal polymerization of the insert- or lens-forming composition in a molding assembly can be carried out conveniently in an oven at a temperature of from 25 to 120° C. and preferably 40 to 100° C., as well known to a person skilled in the art. The reaction time may vary within wide limits, but is conveniently, for example, from 1 to 24 hours or preferably from 2 to 12 hours. It is advantageous to previously degas the silicone-hydrogel-lens-forming composition and to carry out said copolymerization reaction under an inert atmosphere, e.g., under $N_2$ or Ar atmosphere.

The step of separating the first molding assembly can be carried out according to any techniques known to a person skilled in the art. Many techniques are known in the art. For example, the molding surface of the mold half designed to adhere the molded insert can be surface-treated to render the molded insert preferentially adhered to the molding surface of this mold half. Alternatively, a compression force can be applied by using a mold-opening device to non-optical surface (opposite to the molding surface) of the first mold half (not adhering the molded insert) of the first molding assembly at a location about the center area of non-optical molding surface at an angle of less than about 30 degrees, preferably less than about 10 degrees, most preferably less than about 5 degrees (i.e., in a direction substantially normal to center area of non-optical molding surface) relative to the axis of the mold to deform the first male mold half, thereby breaking bonds between the molding surface of the mold half and the molded insert. Various ways of applying a force to non-optical surface of the mold half at a location about the center area of non-optical molding surface along the axis of the mold to deform the mold half which breaks the bonds between the optical molding surface of the mold half and the molded insert. It is understood that the mold-opening device can have any configurations known to a person skilled in the art for performing the function of separating two mold halves from each other.

Similarly, the step of separating the second or third molding assembly can be carried out according to any techniques known to a person skilled in the art.

It is understood that the molded embedded hydrogel contact lens can be adhered onto either one of the two mold halves of the third molding assembly.

The embedded hydrogel contact lens can be delensed (i.e., removed) from the lens-adhered mold half according to any techniques known to a person skilled in the art.

After the embedded hydrogel contact lens is delensed, it typically is extracted with an extraction medium as well known to a person skilled in the art. The extraction liquid medium is any solvent capable of dissolving the diluent(s), unpolymerized polymerizable materials, and oligomers in the embedded silicone hydrogel contact lens. Water, any organic solvents known to a person skilled in the art, or a mixture thereof can be used in the invention. Preferably, the organic solvents used extraction liquid medium are water, a buffered saline, a $C_1$-$C_3$ alkyl alcohol, 1,2-propylene glycol, a polyethyleneglycol having a number average molecular weight of about 400 Daltons or less, a $C_1$-$C_6$ alkylalcohol, or combinations thereof.

The extracted embedded hydrogel contact lens can then be hydrated according to any method known to a person skilled in the art.

The hydrated embedded hydrogel contact lens can further subject to further processes, such as, for example, surface treatment, packaging in lens packages with a packaging solution which is well known to a person skilled in the art; sterilization such as autoclave at from 118 to 124° C. for at least about 30 minutes; and the like.

Lens packages (or containers) are well known to a person skilled in the art for autoclaving and storing a soft contact lens. Any lens packages can be used in the invention. Preferably, a lens package is a blister package which comprises a base and a cover, wherein the cover is detachably sealed to the base, wherein the base includes a cavity for receiving a sterile packaging solution and the contact lens.

Lenses are packaged in individual packages, sealed, and sterilized (e.g., by autoclave at about 120° C. or higher for at least 30 minutes under pressure) prior to dispensing to users. A person skilled in the art will understand well how to seal and sterilize lens packages.

Although various embodiments of the invention have been described using specific terms, devices, and methods, such description is for illustrative purposes only. The words used are words of description rather than of limitation. As would be obvious to one skilled in the art, many variations and modifications of the invention may be made by those skilled in the art without departing from the spirit and scope of the novel concepts of the disclosure. In addition, it should be understood that aspects of the various embodiments of the invention may be interchanged either in whole or in part or can be combined in any manner and/or used together, as illustrated below:

1. A method for producing embedded hydrogel contact lenses, comprising the steps of:
    (1) obtaining a first female mold half, a first male mold half, a second female mold half, and a second male mold half, wherein the first female mold half has a first molding surface having a central portion defining the front surface of a to-be-molded insert, wherein the first male mold half has a second molding surface defining the back surface of the to-be-molded insert, wherein the second female mold half has a third molding surface defining the anterior surface of an embedded hydrogel contact lens, wherein the second male mold half has a fourth molding surface defining the posterior surface of the embedded hydrogel contact lens, wherein the first female mold half and the first male mold half are configured to receive each other such that a first molding cavity is formed between the central portion of the first molding surface and the second molding surfaces when the first female and first male mold halves are closed securely, wherein the first female mold half and the second male mold half are configured to receive each other such that a second molding cavity is formed between the first and fourth molding surfaces when the first female mold half is closed with the second male mold half, wherein the second female mold half and the second male mold half are configured to receive each other such that a third molding cavity is formed between the third and fourth molding surfaces when the second female mold half is closed securely with the second male mold half;
    (2) dispensing an amount of an insert-forming composition on the central portion of the first molding surface of the first female mold half;
    (3) placing the first male mold half on top of the insert-forming composition in the first female mold half and closing the first male mold half and the first female mold half to form a first molding assembly comprising the insert-forming composition therein;
    (4) curing the insert-forming composition in the first molding assembly to form a molded insert that is made of a crosslinked polymeric material formed from the insert-forming composition and has the front surface defined by the central portion of the first molding surface and the back surface defined by the second molding surface;
    (5) separating the first molding assembly obtained in step (4) into the first male mold half and the first female mold half with the molded insert adhered onto the central portion of the first molding surface of the first female mold half;
    (6) dispensing an amount of a first lens-forming composition over the molded insert adhered on the central portion of the first molding surface in the first female mold half;
    (7) placing the second male mold half on top of the first female mold half and closing the second male mold half and the first female mold half to form a second molding assembly comprising the first lens-forming composition and the molded insert immersed therein in the second molding assembly;
    (8) curing the first lens-forming composition in the second molding assembly to form a lens precursor having a convex surface defined by the first molding surface and an opposite concave surface that is defined by the fourth molding surface and is the posterior surface of the embedded hydrogel contact lens, wherein the lens precursor comprise a first hydrogel material formed from the first lens-forming composition and the insert embedded in the first material in such a way that the front surface of the insert merges with the convex surface of the lens precursor while the back surface of the insert is buried beneath the concave surface of the lens precursor;

(9) separating the second molding assembly obtained in step (8) into the second male mold half and the female mold half, with the lens precursor adhered on the second male mold half;

(10) dispensing an amount of a second lens-forming composition on the third molding surface of the second female mold half; over the molded insert adhered on the central portion of the first molding surface in the first female mold half;

(11) placing the second male mold half obtained in step (9) on top of the second female mold half and closing the second male mold half and the second female mold half to form a third molding assembly comprising the second lens-forming composition and the lens precursor immersed therein in the third molding assembly;

(12) curing the second lens-forming composition in the third molding assembly to form an embedded hydrogel contact lens that comprises the insert sandwiched between the first hydrogel material and a second hydrogel material formed from the second lens-forming composition;

(13) separating the third molding assembly obtained in step (12) into the second male mold half and the second female mold half, with the embedded hydrogel contact lens adhered on one of the second male mold half and the second female mold half;

(14) removing the embedded hydrogel contact lens from the lens-adhered mold half (preferably before the embedded hydrogel contact lens is contact with water or any liquid); and

(15) subjecting the embedded hydrogel contact lens to post-molding processes including a hydration process and one or more other processes selected from the group consisting of extraction, surface treatment, packaging, sterilization, and combinations thereof.

2. The method of embodiment 1, wherein the step of (4) curing the insert-forming composition is carried out photochemically by using UV and/or visible light.

3. The method of embodiment 1, wherein the step of (4) curing the insert-forming composition is carried out thermally by heating the first molding assembly in an oven at one or more curing temperature selected from about 40° C. to about 100° C.

4. The method of any one of embodiments 1 to 3, wherein the step of (8) curing the first lens-forming composition is carried out photochemically by using UV and/or visible light.

5. The method of any one of embodiments 1 to 3, wherein the step of (8) curing the first lens-forming composition is carried out thermally by heating the second molding assembly in an oven at one or more curing temperature selected from about 40° C. to about 100° C.

6. The method of any one of embodiments 1 to 5, wherein the step of (12) curing the second lens-forming composition is carried out photochemically by using UV and/or visible light.

7. The method of any one of embodiments 1 to 5, wherein the step of (12) curing the second lens-forming composition is carried out thermally by heating the second molding assembly in an oven at one or more curing temperature selected from about 40° C. to about 100° C.

8. An embedded hydrogel contact lens, comprising:
    an anterior surface; an opposite posterior surface; a diameter of from about 13.5 mm to about 15.5 mm; and an insert which is sandwiched by one anterior layer of a first hydrogel material and one posterior layer of a second hydrogel material,
    wherein the anterior layer includes the anterior surface and the posterior layer includes the posterior surface, wherein the insert is made of a crosslinked polymeric material and has a front surface, an opposite back surface and a diameter of less than 13.0 mm, wherein the insert is located in a central portion of the embedded hydrogel contact lens, wherein the anterior layer and the posterior layer independent of each other have a center thickness of at least about 15 microns, wherein the first and second hydrogel material is identical to each other or different from each other, wherein the embedded hydrogel contact lens is not susceptible to delamination as demonstrated by being free of bubble that can be observed under microscopy at interfaces between the insert and the bulk material within the embedded hydrogel contact lens after being autoclaved in a packaging solution in a sealed package, wherein the packaging solution is a buffered saline having a pH of 7.1±0.2.

9. The method of any one of embodiments 1 to 7 or the embedded hydrogel contact lens of embodiment 8, wherein the crosslinked polymeric material of the insert comprises repeating units of at least one polymerizable photochromic compound (i.e., photochromic vinylic monomer), at least one UV-absorbing vinylic monomer, at least one UV/HEVL-absorbing vinylic monomer, at least one fluorescent vinylic monomer, or combinations thereof.

10. The method of any one of embodiments 1 to 7 or the embedded hydrogel contact lens of embodiment 8, wherein the crosslinked polymeric material of the insert comprises at least one color-filtering material for correcting color blindness, a diffractive material, a high refractive-index material, or combinations.

11. The method of any one of embodiments 1-7 and 9-10 or the embedded hydrogel contact lens of any one of embodiments 8-10, wherein the crosslinked polymeric material of the insert is a hard plastics.

12. The method or the embedded hydrogel contact lens of embodiment 11, wherein the hard plastics is a crosslinked polymethylmethacrylate.

13. The method of any one of embodiments 1-7 and 9-10 or the embedded hydrogel contact lens of any one of embodiments 8-10, wherein the crosslinked polymeric material of the insert is a crosslinked silicone polymer that has three-dimensional polymer networks, is insoluble in water, and has an equilibrium water content of about 5% or less by weight.

14. The method or the embedded hydrogel contact lens of embodiment 13, wherein the crosslinked silicone polymer has an equilibrium water content of about 3% or less by weight.

15. The method of any one of embodiments 1-7 and 9-10 or the embedded hydrogel contact lens of any one of embodiments 8-10, wherein the crosslinked polymeric material of the insert is a rigid gas permeable material.

16. The method of any one of embodiments 1-7 and 9-10 or the embedded hydrogel contact lens of any one of embodiments 8-10, wherein the crosslinked polymeric material of the insert is a hydrophobic crosslinked acrylic material that has an equilibrium water content of less than 5% by weight and comprises at least 55% by mole of repeating units of one or more acrylic monomers and/or one or more acrylic crosslinker and at least about 6% by mole of repeating units of at least one vinylic crosslinking agent.

17. The method or embedded hydrogel contact lens of embodiment 16, wherein the hydrophobic crosslinked acrylic material has an equilibrium water content of about 4% or less by weight.

18. The method or embedded hydrogel contact lens of embodiment 16, wherein the hydrophobic crosslinked acrylic material has an equilibrium water content of about 3% or less by weight.

19. The method or embedded hydrogel contact lens of embodiment 16, wherein the hydrophobic crosslinked acrylic material has an equilibrium water content of about 2% or less by weight.

20. The method or embedded hydrogel contact lens of any one of embodiments 16 to 19, wherein the crosslinked polymeric acrylic material comprises at least about 60% by mole of repeating units of said one or more acrylic monomers and/or said one or more acrylic crosslinker.

21. The method or embedded hydrogel contact lens of any one of embodiments 16 to 19, wherein the crosslinked polymeric acrylic material comprises at least about 65% by mole of repeating units of said one or more acrylic monomers and/or said one or more acrylic crosslinker.

22. The method or embedded hydrogel contact lens of any one of embodiments 16 to 19, wherein the crosslinked polymeric material comprises at least about 70% by mole of repeating units of said one or more acrylic monomers and/or said one or more acrylic crosslinker.

23. The method or embedded hydrogel contact lens of any one of embodiments 16 to 22, wherein the crosslinked polymeric material comprises at least about 8% by mole of repeating units of said at least one vinylic crosslinking agent.

24. The method or embedded hydrogel contact lens of any one of embodiments 16 to 22, wherein the crosslinked polymeric material comprises at least about 10% by mole of repeating units of said at least one vinylic crosslinking agent.

25. The method or embedded hydrogel contact lens of any one of embodiments 16 to 22, wherein the crosslinked polymeric acrylic material comprises at least about 12% by mole of repeating units of said at least one vinylic crosslinking agent.

26. The method or embedded hydrogel contact lens of any one of embodiments 16 to 25, wherein said at least one vinylic crosslinking agent comprises at least one acrylic crosslinking agent.

27. The method or embedded hydrogel contact lens of embodiment 26, wherein said at least one acrylic crosslinking agent is ethylene glycol dimethacrylate; ethylene glycol diacrylate; 1,3-propanediol diacrylate; 1,3-propanediol dimethacrylate; 2,3-propanediol diacrylate; 2,3-propanediol dimethacrylate; 1,4-butanediol dimethacrylate; 1,4-butanediol diacrylate; 1,5-pentanediol dimethacrylate; 1,5-pentanediol diacrylate; 1,6-hexanediol dimethacrylate; 1,6-hexanediol diacrylate; diethylene glycol dimethacrylate; diethylene glycol diacrylate; triethylene glycol dimethacrylate; triethylene glycol diacrylate; tetraethylene glycol dimethacrylate; tetraethylene glycol diacrylate; N,N'-methylene bis(acrylamide); N,N'-methylene bis(methacrylamide); N,N'-ethylene bis(acrylamide); N,N'-ethylene bis(methacrylamide); N,N'-hexamethylene bisacrylamide; N,N'-hexamethylene bismethacrylamide; pentaerythritol triacrylate, pentaerythritol trimethacrylate, trimethyloylpropane triacrylate, trimethyloylpropane trimethacrylate, tris(2-hydroxyethyl)isocyanurate triacrylate, tris(2-hydroxyethyl) isocyanurate trimethacrylate, 1,3,5-triacryloxylhexahydro-1,3,5-triazine, 1,3,5-trimethacryloxylhexahydro-1,3,5-triazine; pentaerythritol tetraacrylate, pentaerythritol tetramethacrylate, di(trimethyloylpropane) tetraacrylate, di(trimethyloylpropane) tetramethacrylate, or combinations thereof.

28. The method or embedded hydrogel contact lens of embodiment 16 to 27, wherein said at least one vinylic crosslinking agent comprises allyl methacrylate, allyl acrylate, an aryl crosslinking agent, triallyl isocyanurate, 2,4,6-triallyloxy-1,3,5-triazine, 1,2,4-trivinylcyclohexane, or combinations thereof.

29. The method or embedded hydrogel contact lens of embodiment 16 to 27, wherein said at least one vinylic crosslinking agent comprises 2-methyl-1,4-divinylbenzene, divinylbenzene, bis(4-vinylphenyl)methane, divinylbenzene, 1,2-bs(4-vinylphenyl)ethane, or combinations thereof.

30. The method or embedded hydrogel contact lens of any one of embodiments 16 to 29, wherein the crosslinked polymeric acrylic material comprises repeating units of at least one acrylic monomer which comprises a silicone-containing acrylic monomer, a non-silicone hydrophobic acrylic monomer, a fluorine-containing acrylic monomer, an aryl acrylic monomer, or a combination thereof.

31. The method or embedded hydrogel contact lens of any one of embodiments 16 to 29, wherein the crosslinked polymeric acrylic material comprises repeating units of at least one non-silicone hydrophobic acrylic monomer.

32. The method or embedded hydrogel contact lens of embodiment 31, wherein said at least one non-silicone hydrophobic acrylic monomer is (methyl (meth)acrylate, ethyl (meth)acrylate, propyl (meth)acrylate, isopropyl (meth)acrylate, cyclohexyl (meth)acrylate, 2-ethylhexyl (meth)acrylate, isobornyl (meth)acrylate, (meth)acrylonitrile, or combinations thereof.

33. The method or embedded hydrogel contact lens of any one of embodiments 16 to 32, wherein the crosslinked polymeric acrylic material comprises repeating units of at least one fluorine-containing acrylic monomer.

34. The method or embedded hydrogel contact lens of embodiment 33, wherein said at least one fluorine-containing acrylic monomer is perfluorohexylethyl-thio-carbonyl-aminoethyl-methacrylate, 2,2,2-trifluoroethyl (meth)acrylate, tetrafluoropropyl (meth)acrylate, hexafluoro-iso-propyl (meth)acrylate, hexafluorobutyl (meth)acrylate, heptafluorobutyl (meth)acrylate, octafluoropentyl (meth)acrylate, heptadecafluorodecyl (meth)acrylate, pentafluorophenyl (meth)acrylate, or combinations thereof.

35. The method or embedded hydrogel contact lens of any one of embodiments 16 to 34, wherein the crosslinked polymeric acrylic material comprises repeating units of at least one silicone-containing acrylic monomer.

36. The method or embedded hydrogel contact lens of any one of embodiments 16 to 35, wherein the crosslinked polymeric material comprises repeating units of at least one polysiloxane vinylic crosslinker.

37. The method or embedded hydrogel contact lens of embodiment 36, wherein said at least polysiloxane vinylic crosslinker comprises at least 30% by mole of siloxane units each having at least one phenyl substituent.

38. The method or embedded hydrogel contact lens of embodiment 36, wherein said at least polysiloxane vinylic crosslinker comprises at least 60% by mole of siloxane units each having at least one phenyl substituent.

39. The method or embedded hydrogel contact lens of embodiment 36, wherein said at least polysiloxane vinylic crosslinker comprises at least 90% by mole of siloxane units each having at least one phenyl substituent.

40. The method or embedded hydrogel contact lens of embodiment 36, wherein said at least polysiloxane vinylic crosslinker comprises three or more vinylphenylsiloxane units each having at least one phenyl substituent and one vinyl substituent.

41. The method or embedded hydrogel contact lens of embodiment 36, wherein said at least polysiloxane vinylic crosslinker comprises three or more phenylmethylsiloxane units.

42. The method or embedded hydrogel contact lens of embodiment 36, wherein said at least polysiloxane vinylic crosslinker comprises three or more diphenylsiloxane units.

43. The method or embedded hydrogel contact lens of embodiment 36, wherein said at least polysiloxane vinylic crosslinker comprises one or more vinyl terminated polyphenylmethysiloxanes, one or more vinylphenylmethyl terminated phenylmethyl-vinylphenylsiloxane copolymers, one or more vinyl terminated diphenylsiloxane-dimethylsiloxane copolymers, or combinations thereof.

44. The method or embedded hydrogel contact lens of embodiment 36, wherein said at least polysiloxane vinylic crosslinker comprises one or more vinyl terminated polyphenylmethysiloxanes.

45. The method or embedded hydrogel contact lens of embodiment 36, wherein said at least polysiloxane vinylic crosslinker comprises one or more vinylphenylmethyl terminated phenylmethyl-vinylphenylsiloxane copolymers.

46. The method or embedded hydrogel contact lens of any one of embodiments 16 to 45, wherein the crosslinked polymeric acrylic material comprises repeating units of at least one aryl acrylic monomer of formula (I) or (II)

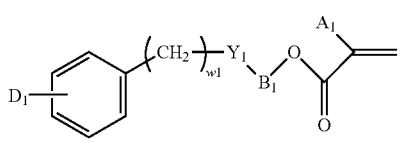

(I)

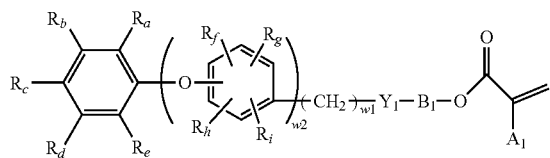

(II)

wherein $A_1$ is H or $CH_3$ (preferably H); $B_1$ is $(CH_2)_{m1}$ or $[O(CH_2)_2]_{z1}$ in which m1 is 2-6 and z1 is 1-10; $Y_1$ is a direct bond, O, S, or NR' in which R' is H, $CH_3$, $C_{n'}H_{2n'+1}$ in which n'=1-10, iso-$OC_3H_7$, $C_6H_5$, or $CH_2C_6H_5$; $R_a$, $R_b$, $R_c$, $R_d$, $R_e$, $R_f$, $R_g$, $R_h$, and $R_i$ independent of one another are H, $C_1$-$C_{12}$ alkyl, or $C_1$-$C_{12}$ alkoxy (preferably all are H); w1 is 0-6, provided that m1+w1≤8; w2 is an integer from 1 to 3; and $D_1$ is H, Cl, Br, $C_1$-$C_4$ alkyl, $C_1$-$C_4$ alkoxy, $C_6H_5$, or $CH_2C_6H_5$.

47. The method or embedded hydrogel contact lens of embodiment 46, wherein said at least one aryl acrylic monomer comprises at least one vinylic monomer selected from the group consisting of 2-ethylphenoxy acrylate; 2-ethylphenoxy methacrylate; phenyl acrylate; phenyl methacrylate; benzyl acrylate; benzyl methacrylate; 2-phenylethyl acrylate; 2-phenylethyl methacrylate; 3-phenylpropyl acrylate; 3-phenylpropyl methacrylate; 4-phenylbutyl acrylate; 4-phenylbutyl methacrylate; 4-methylphenyl acrylate; 4-methylphenyl methacrylate; 4-methylbenzyl acrylate; 4-methylbenzyl methacrylate; 2-(2-methylphenyl)ethyl acrylate; 2-(2-methylphenyl)ethyl methacrylate; 2-(3-methylphenyl)ethyl acrylate; 2-(3-methylphenyl)ethyl methacrylate; 2-(4-methylphenyl)ethyl acrylate; 2-(4-methylphenyl)ethyl methacrylate; 2-(4-propylphenyl)ethyl acrylate; 2-(4-propylphenyl)ethyl methacrylate; 2-(4-(1-methylethyl)phenyl)ethyl acrylate; 2-(4-(1-methylethyl)phenyl)ethyl methacrylate; 2-(4-methoxyphenyl)ethyl acrylate; 2-(4-methoxyphenyl)ethyl methacrylate; 2-(4-cyclohexylphenyl)ethyl acrylate; 2-(4-cyclohexylphenyl)ethyl methacrylate; 2-(2-chlorophenyl)ethyl acrylate; 2-(2-chlorophenyl)ethyl methacrylate; 2-(3-chlorophenyl)ethyl acrylate; 2-(3-chlorophenyl)ethyl methacrylate; 2-(4-chlorophenyl)ethyl acrylate; 2-(4-chlorophenyl)ethyl methacrylate; 2-(4-bromophenyl)ethyl acrylate; 2-(4-bromophenyl)ethyl methacrylate; 2-(3-phenylphenyl)ethyl acrylate; 2-(3-phenylphenyl)ethyl methacrylate; 2-(4-phenylphenyl)ethyl acrylate; 2-(4-phenylphenyl)ethyl methacrylate; 2-(4-benzylphenyl)ethyl acrylate; 2-(4-benzylphenyl)ethyl methacrylate; 2-(phenylthio)ethyl acrylate; 2-(phenylthio)ethyl methacrylate; 2-benzyloxyethyl acrylate; 3-benzyloxypropyl acrylate; 2-benzyloxyethyl methacrylate; 3-benzyloxypropyl methacrylate; 2-[2-(benzyloxy)ethoxy]ethyl acrylate; 2-[2-(benzyloxy)ethoxy]ethyl methacrylate, and combinations thereof.

48. The method or embedded hydrogel contact lens of embodiment 46, wherein said at least one aryl acrylic monomer comprises 2-phenylethyl acrylate; 3-phenylpropyl acrylate; 4-phenylbutyl acrylate; 5-phenylpentyl acrylate; 2-benzyloxyethyl acrylate; 3-benzyloxypropyl acrylate; 2-[2-(benzyloxy)ethoxy]ethyl acrylate; 2-phenylethyl methacrylate; 3-phenylpropyl methacrylate; 4-phenylbutyl methacrylate; 5-phenyl pentyl methacrylate; 2-benzyloxyethyl methacrylate; 3-benzyloxypropyl methacrylate; 2-[2-(benzyloxy)ethoxy]ethyl methacrylate, or combinations thereof.

49. The method or embedded hydrogel contact lens of any one of embodiments 16 to 48, wherein the crosslinked polymeric material comprises repeating units of at least one hydrohobic vinylic monomer selected from the group consisting of a vinyl alkanoate, a vinyloxyalkane, styrene, vinyl toluene, vinyl chloride, vinylidene chloride, 1-butene, and combinations thereof.

50. The method or embedded hydrogel contact lens of any one of embodiments 16 to 49, wherein the hydrophobic insert is rigid.

51. The method of any one of embodiments 1-7 and 9-50 or the embedded hydrogel contact lens of any one of embodiments 8-50, wherein the first and second hydrogel materials independent of each other are a non-silicone hydrogel material comprising at least 50% by mole of repeating units of at least one hydroxyl-containing vinylic monomer.

52. The method or embedded hydrogel contact lens of embodiment 51, wherein said at least one hydroxyl-containing vinylic monomer is selected from the group consisting of hydroxyethyl (meth)acrylate, glycerol (meth)acrylate, 3-hydroxypropyl (meth)acrylate, 2-hydroxypropyl (meth)acrylate, 3-amino-2-hydroxypropyl (meth)acrylate, N-2-hydroxyethyl (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth)acrylamide, vinyl alcohol, allyl alcohol, and combinations thereof.

53. The method of any one of embodiments 1-7 and 9-51 or the embedded hydrogel contact lens of any one of embodiments 8-51, wherein the first and second hydrogel materials independent of each other are a silicone hydrogel material 54. The method or embedded hydrogel contact lens of embodiment 53, where the silicone hydrogel materia comprises (a) repeating units of at least one first polysiloxane vinylic crosslinker comprising hydrophilized siloxane units each having one methyl substituent and one organic radical including at least one H-bond donor and (b) repeating units of at least one hydrophilic vinylic monomer, wherein the content of said at least one H-bond donor is at least about 0.8 meq/g relative to the molecular weight of said at least one first polysiloxane vinylic crosslinker.

55. The method or embedded hydrogel contact lens of embodiment 54, wherein said at least one first polysiloxane vinylic crosslinker comprises hydrophilized siloxane units each having one methyl substituent and one organic radical including at least one hydroxyl groups.

56. The method or embedded hydrogel contact lens of embodiment 54 or 55, wherein the content of said at least one H-bond donor is at least about 1.0 meq/g relative to the molecular weight of said at least one first polysiloxane vinylic crosslinker.

57. The method or embedded hydrogel contact lens of embodiment 54 or 55, wherein the content of said at least one H-bond donor is at least about 1.2 meq/g relative to the molecular weight of said at least one first polysiloxane vinylic crosslinker.

58. The method or embedded hydrogel contact lens of embodiment 54 or 55, wherein the content of said at least one H-bond donor is at least about 1.4 meq/g relative to the molecular weight of said at least one first polysiloxane vinylic crosslinker.

59. The method or embedded hydrogel contact lens of any one of embodiments 54 to 58, wherein said at least one first polysiloxane vinylic crosslinker comprises a di-(meth)acryloyloxy-terminated polysiloxane vinylic crosslinker having dimethylsiloxane units and hydrophilized siloxane units each having one methyl substituent and one monovalent $C_4$-$C_{40}$ organic radical substituent having 2 to 6 hydroxyl groups.

60. The method or embedded hydrogel contact lens of any one of embodiments 54 to 58, wherein said at least one first polysiloxane vinylic crosslinker comprises a vinylic crosslinker of formula (G)

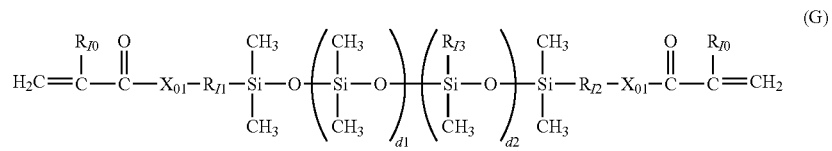

in which:
d1 is an integer of from 30 to 500 and d2 is an integer of from 1 to 75, provided that
d2/d1 is from about 0.035 to about 0.15;
$X_{01}$ is O or $NR_{IN}$ in which $R_{IN}$ is hydrogen or $C_1$-$C_{10}$-alkyl;
$R_{I0}$ is hydrogen or methyl;
$R_{I1}$ and $R_{I2}$ independently of each other are a substituted or unsubstituted $C_1$-$C_{10}$ alkylene divalent radical or a divalent radical of —$R_{I4}$—O—$R_{I5}$— in which $R_{14}$ and $R_{15}$ independently of each other are a substituted or unsubstituted $C_1$-$C_{10}$ alkylene divalent radical;
$R_{I3}$ is a monovalent radical of any one of formula (G-1) to (G-5)

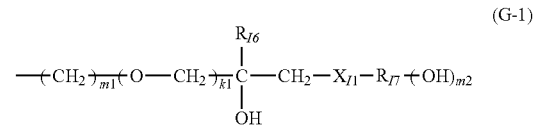

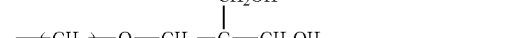

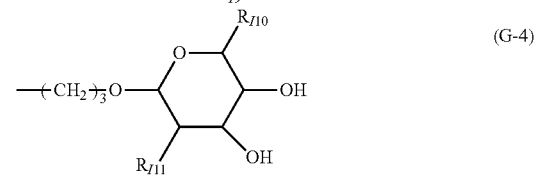

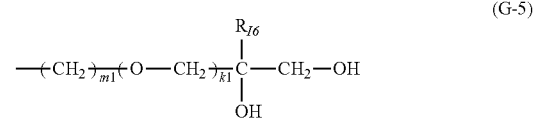

k1 is zero or 1; m1 is an integer of 2 to 4; m2 is an integer of 1 to 5; m3 is an integer of 3 to 6; m4 is an integer of 2 to 5;
$R_{I6}$ is hydrogen or methyl;
$R_{I7}$ is a $C_2$-$C_6$ hydrocarbon radical having (m2+1) valencies;
$R_{I8}$ is a $C_2$-$C_6$ hydrocarbon radical having (m4+1) valencies;

$R_{I9}$ is ethyl or hydroxymethyl;
$R_{I10}$ is methyl or hydromethyl;
$R_{I11}$ is hydroxyl or methoxy;
$X_{I1}$ is a sulfur linkage of —S— or a teriary amino linkage of —$NR_{I12}$— in which $R_{I12}$ is $C_1$-$C_1$ alkyl, hydroxyethyl, hydroxypropyl, or 2,3-dihydroxypropyl; and
$X_{I2}$ is an amide linkage of

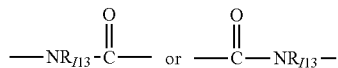

in which $R_{I13}$ is hydrogen or $C_1$-$C_{10}$ alkyl.
61. The method or embedded hydrogel contact lens of embodiment 60, wherein in formula (G) d2/d1 is from about 0.040 to about 0.12.
62. The method or embedded hydrogel contact lens of embodiment 60, wherein in formula (G) d2/d1 is from about 0.045 to about 0.10.
63. The method or embedded hydrogel contact lens of any one of embodiments 60 to 62, wherein in formula (G) $R_{I3}$ is a monovalent radical of formula (G-1).
64. The method or embedded hydrogel contact lens of any one of embodiments 60 to 62, wherein in formula (G) $R_{I3}$ is a monovalent radical of formula (G-2).
65. The method or embedded hydrogel contact lens of any one of embodiments 60 to 62, wherein in formula (G) $R_{I3}$ is a monovalent radical of formula (G-3).
66. The method or embedded hydrogel contact lens of any one of embodiments 60 to 62, wherein in formula (G) $R_{I3}$ is a monovalent radical of formula (G-4).
67. The method or embedded hydrogel contact lens of any one of embodiments 60 to 62, wherein in formula (G) $R_{I3}$ is a monovalent radical of formula (G-5).
68. The method or embedded hydrogel contact lens of any one of embodiments 54 to 67, wherein said at least one hydrophilic vinylic monomer comprises: (1) an alkyl (meth)acrylamide selected from the group consisting of (meth)acrylamide, N,N-dimethyl (meth)acrylamide, N-ethyl (meth)acrylamide, N,N-diethyl (meth)acrylamide, N-propyl (meth)acrylamide, N-isopropyl (meth)acrylamide, N-3-methoxypropyl (meth)acrylamide, and combinations thereof; (2) a hydroxyl-containing acrylic monomer selected from the group consisting of N-2-hydroxylethyl (meth)acrylamide, N,N-bis(hydroxyethyl) (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth)acrylamide, 2-hydroxyethyl (meth)acrylate, 3-hydroxypropyl (meth)acrylate, 2-hydroxypropyl (meth)acrylate, glycerol methacrylate (GMA), di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1500, poly(ethylene glycol)ethyl (meth)acrylamide having a number average molecular weight of up to 1500, and combinations thereof; (3) a carboxyl-containing acrylic monomer selected from the group consisting of 2-(meth)acrylamidoglycolic acid, (meth)acrylic acid, ethylacrylic acid, 3-(emth)acrylamidopropionic acid, 5-(meth)acrylamidopentanoic acid, 4-(meth)acrylamidobutanoic acid, 3-(meth)acrylamido-2-methylbutanoic acid, 3-(meth)acrylamido-3-methylbutanoic acid, 2-(emth)acrylamido-2methyl-3,3-dimethyl butanoic acid, 3-(meth)acrylamidohaxanoic acid, 4-(meth)acrylamido-3,3-dimethylhexanoic acid, and combinations thereof; (4) an amino-containing acrylic monomer selected from the group consisting of N-2-aminoethyl (meth)acrylamide, N-2-methylaminoethyl (meth)acrylamide, N-2-ethylaminoethyl (meth)acrylamide, N-2-dimethylaminoethyl (meth)acrylamide, N-3-aminopropyl (meth)acrylamide, N-3-methylaminopropyl (meth)acrylamide, N-3-dimethylaminopropyl (meth)acrylamide, 2-aminoethyl (meth)acrylate, 2-methylaminoethyl (meth)acrylate, 2-ethylaminoethyl (meth)acrylate, 3-aminopropyl (meth)acrylate, 3-methylaminopropyl (meth)acrylate, 3-ethylaminopropyl (meth)acrylate, 3-amino-2-hydroxypropyl (meth)acrylate, trimethylammonium 2-hydroxy propyl (meth)acrylate hydrochloride, di methylaminoethyl (meth)acrylate, and combinations thereof; (5) an N-vinyl amide monomer selected from the group consisting of N-vinylpyrrolidone (aka, N-vinyl-2-pyrrolidone), N-vinyl-3-methyl-2-pyrrolidone, N-vinyl-4-methyl-2-pyrrolidone, N-vinyl-5-methyl-2-pyrrolidone, N-vinyl-6-methyl-2-pyrrolidone, N-vinyl-3-ethyl-2-pyrrolidone, N-vinyl-4,5-dimethyl-2-pyrrolidone, N-vinyl-5,5-dimethyl-2-pyrrolidone, N-vinyl-3,3,5-trimethyl-2-pyrrolidone, N-vinyl piperidone (aka, N-vinyl-2-piperidone), N-vinyl-3-methyl-2-piperidone, N-vinyl-4-methyl-2-piperidone, N-vinyl-5-methyl-2-piperidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl caprolactam (aka, N-vinyl-2-caprolactam), N-vinyl-3-methyl-2-caprolactam, N-vinyl-4-methyl-2-caprolactam, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam, N-vinyl-3,5,7-trimethyl-2-caprolactam, N-vinyl-N-methyl acetamide, N-vinyl formamide, N-vinyl acetamide, N-vinyl isopropylamide, N-vinyl-N-ethyl acetamide, N-vinyl-N-ethyl formamide, and mixtures thereof; (6) a methylene-containing pyrrolidone monomer selected from the group consisting of 1-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, and combinations thereof; (7) an acrylic monomer having a $C_1$-$C_4$ alkoxyethoxy group and selected from the group consisting of ethylene glycol methyl ether (meth)acrylate, di(ethylene glycol) methyl ether (meth)acrylate, tri(ethylene glycol) methyl ether (meth)acrylate, tetra(ethylene glycol) methyl ether (meth)acrylate, $C_1$-$C_4$-alkoxy poly(ethylene glycol) (meth)acrylate having a number average molecular weight of up to 1500, methoxy-poly(ethylene glycol)ethyl (meth)acrylamide having a number average molecular weight of up to 1500, and combinations thereof; (8) a vinyl ether monomer selected from the group consisting of ethylene glycol monovinyl ether, di(ethylene glycol) monovinyl ether, tri(ethylene glycol) monovinyl ether, tetra(ethylene glycol) monovinyl ether, poly(ethylene glycol) monovinyl ether, ethylene glycol methyl vinyl ether, di(ethylene glycol) methyl vinyl ether, tri(ethylene glycol) methyl vinyl ether, tetra(ethylene glycol) methyl vinyl ether, poly(ethylene glycol) methyl vinyl ether, and combinations thereof; (9) an allyl ether monomer selected from the group consisting of ethylene glycol monoallyl ether, di(ethylene glycol) monoallyl ether, tri(ethylene glycol) monoallyl ether, tetra(ethylene glycol) monoallyl ether, poly(ethylene glycol) monoallyl ether, ethylene glycol methyl allyl ether, di(ethylene glycol) methyl allyl ether, tri(ethylene glycol) methyl allyl ether, tetra(ethylene glycol) methyl allyl ether, poly(ethylene glycol) methyl allyl ether, and combinations thereof; (10) a phosphorylcholine-containing vinylic monomer selected from the group consisting of (meth)acryloyloxyethyl phosphorylcholine, (meth)acryloyloxypropyl phosphorylcholine, 4-((meth)acryloyloxy)butyl-2'-(trimethylammonio)ethyl phosphate, 2-[(meth)acryloylamino]ethyl-2'-(trimethylammonio)-ethyl phosphate, 3-[(meth)acryloylamino]propyl-2'-(trimethylammonio)ethyl phosphate, 4-[(meth)acryloylamino]butyl-2'-(trimethylarnmonio)ethyl phosphate, 5-((meth)acryloyloxy)-pentyl-2'-(trimethylammonio)ethyl phosphate, 6-((meth)acryloyloxy)hexyl-2'-(trimethylammonio)ethyl phosphate, 2-((meth)acryloyloxy)ethyl-2'-(triethylammonio)-ethyl phosphate, 2-((meth)acryloyloxy)ethyl-2'-(tripropylammonio)ethyl phosphate, 2-((meth)acryloyloxy)ethyl-2'-(tributylammonio)ethyl phosphate, 2-((meth)acryloyloxy)propyl-2'-(trimethylammonio)-ethyl phosphate, 2-((meth)acryloyloxy)butyl-2'-(trimethylammonio)-ethyl phosphate, 2-((meth)acryloyloxy)pentyl-2'-(trimethylammonio)ethyl phosphate, 2-((meth)acryloyloxy)hexyl-2'-(trimethylammonio)ethyl phosphate, 2-(vinyloxy)ethyl-2'-(trimethylammonio) ethyl phosphate, 2-(allyloxy)ethyl-2'-(trimethylammonio) ethyl phosphate, 2-(vinyloxycarbonyl)ethyl-2'-(trimethylammonio)ethyl phosphate, 2-(allyloxycarbonyl)ethyl-2'-(trimethylammonio)-ethyl phosphate, 2-(vinylcarbonylamino)ethyl-2'-(trimethylarnmonio)-ethyl phosphate, 2-(allyloxycarbonylamino)ethyl-2'-(trimethylammonio)ethyl phosphate, 2-(butenoyloxy)ethyl-2'-(trimethylammonio)ethylphosphate, and combinations thereof; (11) allyl alcohol; (12) N-2-hydroxyethyl vinyl carbamate; (13) N-carboxyvinyl-β-alanine (VINAL); (14) N-carboxyvinyl-α-alanine; (15) or combinations thereof.

69. The method or embedded hydrogel contact lens of any one of embodiments 54 to 67, wherein said at least one hydrophilic vinylic monomer comprises N-vinylpyrrolidone, N-vinyl-N-methyl acetamide, or combinations thereof.

70. The method or embedded hydrogel contact lens of any one of embodiments 54 to 69, wherein said at least one hydrophilic vinylic monomer comprises N,N-dimethyl (meth)acrylamide.

71. The method or embedded hydrogel contact lens of any one of embodiments 54 to 70, wherein said at least one hydrophilic vinylic monomer comprises N-2-hydroxyethyl (meth)acrylamide, N,N-bis(hydroxyethyl) (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth)acrylamide, 2-hydroxyethyl (meth)acrylate, 3-hydroxypropyl (meth)acrylate, 2-hydroxypropyl (meth)acrylate, glycerol methacrylate (GMA), di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1500, poly(ethylene glycol)ethyl (meth)acrylamide having a number average molecular weight of up to 1500, or combinations thereof.

72. The method or embedded hydrogel contact lens of any one of embodiments 54 to 71, wherein the silicone hydrogel material comprises repeating units of at least one silicone-containing vinylic monomer selected from the group consisting of a vinylic monomer having a bis(trialkylsilyloxy)alkylsilyl group, a vinylic monomer having a tris(trialkylsilyloxy)silyl group, a polysiloxane vinylic monomer, 3-methacryloxy propylpentamethyldisiloxane, t-butyldimethyl-siloxyethyl vinyl carbonate, trimethylsilylethyl vinyl carbonate, and trimethylsilylmethyl vinyl carbonate, and combinations thereof.

73. The method or embedded hydrogel contact lens of any one of embodiments 54 to 71, wherein the silicone hydrogel material comprises repeating units of at least one silicone-containing vinylic monomer of formula (M1) or (M2)

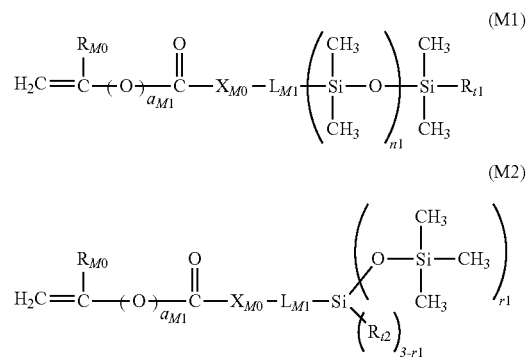

in which: $a_{M1}$ is zero or 1; $R_{M0}$ is H or methyl; $X_{M0}$ is O or $NR_{M1}$; $L_{M1}$ is a $C_2$-$C_8$ alkylene divalent radical or a divalent radical of

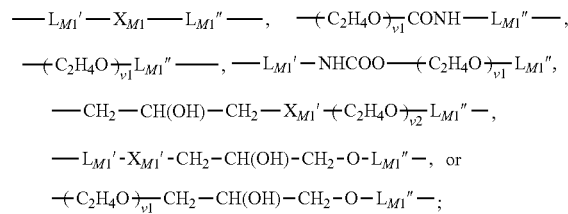

$L_{M1}'$ is a $C_2$-$C_8$ alkylene divalent radical which has zero or one hydroxyl group; $L_{M1}''$ is $C_3$-$C_8$ alkylene divalent radical which has zero or one hydroxyl group; $X_{M1}$ is O, $NR_{M1}$, NHCOO, OCONH, $CONR_{M1}$, or $NR_{M1}CO$; $R_{M1}$ is H or a $C_1$-$C_4$ alkyl having 0 to 2 hydroxyl group; $R_{t1}$ and $R_{t2}$ independent of each other are a $C_1$-$C_6$ alkyl; $X_{M1}'$ is O or $NR_1$; v1 is an integer of 1 to 30; m2 is an integer of 0 to 30; n1 is an integer of 3 to 40; and r1 is an integer of 2 or 3.

74. The method or embedded hydrogel contact lens of any one of embodiments 54 to 71, wherein the silicone hydrogel material comprises tris(trimethylsilyloxy)silylpropyl (meth)acrylate, [3-(meth)acryloxy-2-hydroxypropyloxy]propylbis(trimethylsiloxy) methylsilane, [3-(meth)acryloxy-2-hydroxypropyloxy]propylbis(trimethylsiloxy)butylsilane, 3-(meth)acryloxy-2-(2-hydroxyethoxy)-propyloxy)propylbis(trimethylsiloxy) methylsilane, 3-(meth)acryloxy-2-hydroxypropyloxy)propyltris(trimethylsiloxy)silane, N-[tris (trimethylsiloxy)-silylpropyl]-(meth)acrylamide, N-(2-hydroxy-3-(3-(bis(trimethylsilyloxy)methylsilyl)-propyloxy)propyl)-2-methyl (meth)acrylamide, N-(2-hydroxy-3-(3-(bis(trimethylsilyloxy)-methylsilyl)propyloxy)-propyl) (meth)acrylamide, N-(2-hydroxy-3-(3-(tris (trimethylsilyloxy)-silyl)propyloxy)propyl)-2-methyl acrylamide, N-(2-hydroxy-3-(3-(tris(trimethylsilyloxy)silyl)-propyloxy)propyl) (meth)acrylamide, N-[tris(dimethylpropylsiloxy)silylpropyl]-(meth)acrylamide, N-[tris(dimethylphenylsiloxy)-silylpropyl] (meth)acrylamide, N-[tris(dimethylethylsiloxy)-silylpropyl] (meth)acrylamide, N,N-bis[2-hydroxy-3-(3-(bis(trimethylsilyloxy) methylsilyl)-propyloxy)propyl]-2-methyl (meth)acrylamide, N,N-bis[2-hydroxy-3-(3-(bis(trimethylsilyloxy) methylsilyl)propyloxy)-propyl] (meth)acrylamide, N,N-bis[2-hydroxy-3-(3-(tris(trimethylsilyloxy)silyl) propyloxy)-propyl]-2-methyl (meth)acrylamide, N,N-bis [2-hydroxy-3-(3-(tris(trimethylsilyloxy)silyl)-propyloxy) propyl] (meth)acrylamide, N-[2-hydroxy-3-(3-(t-butyldimethylsilyl)propyloxy)-propyl]-2-methyl (meth) acrylamide, N-[2-hydroxy-3-(3-(t-butyldimethylsilyl) propyloxy)-propyl] (meth)acrylamide, N,N-bis[2-hydroxy-3-(3-(t-butyldimethylsilyl)propyloxy)propyl]-2-methyl (meth)acrylamide, N-2-(meth)acryloxyethyl-O-(methyl-bis-trimethylsiloxy-3-propyl)silyl carbamate, 3-(trimethylsilyl)propylvinyl carbonate, 3-(vinyloxycarbonylthio)-propyl-tris(trimethyl-siloxy)silane, 3-[tris (trimethylsiloxy)silyl]propylvinyl carbamate, 3-[tris (trimethylsiloxy)silyl] propyl allyl carbamate, 3-[tris (trimethylsiloxy)silyl]propyl vinyl carbonate, or a combination thereof.

75. The method or embedded hydrogel contact lens of any one of embodiments 54 to 74, wherein the silicone hydrogel material comprises α-(meth)acryloxypropyl terminated ω-$C_1$-$C_4$-alkyl terminated polydimethylsiloxane, α-(meth)acryloxy-2-hydroxypropyloxypropyl terminated ω-$C_1$-$C_4$-alkyl terminated polydimethylsiloxane, α-(2-hydroxyl-methacryloxypropyloxypropyl)-ω-$C_1$-$C_4$-alkyl-decamethylpentasiloxane, α-[3-(meth)acryloxyethoxy-2-hydroxypropyloxypropyl]-terminated ω-$C_1$-$C_4$-alkyl terminated polydimethylsiloxane, α[3-(meth)acryloxypropyloxy-2-hydroxypropyloxypropyl]-terminated ω-$C_1$-$C_4$-alkyl terminated polydimethylsiloxane, α-[3-(meth)acryloxyisopropyloxy-2-hydroxypropyloxypropyl] terminated ω-$C_1$-$C_4$-alkyl terminated polydimethylsiloxane, α-[3-(meth)acryloxybutyloxy-2-hydroxypropyloxypropyl]-terminated ω-$C_1$-$C_4$-alkyl terminated polydimethylsiloxane, α-[3-(meth)acryloxyethylamino-2-hydroxypropyloxypropyl]-terminated ω-$C_1$-$C_4$-alkyl terminated polydimethylsiloxane, α-[3-(meth) acryloxypropylamino-2-hydroxypropyloxypropyl]-terminated ω-$C_1$-$C_4$-alkyl terminated polydimethylsiloxane, α-[3-(meth)acryloxy-butylamino-2-hydroxypropyloxypropyl]-terminated ω-$C_1$-$C_4$-alkyl terminated polydimethylsiloxane, α-(meth)acryloxy (polyethylenoxy)-2-hydroxypropyloxypropyl]-terminated ω-$C_1$-$C_4$-alkyl terminated polydimethylsiloxane, α-[(meth)acryloxy-2-hydroxypropyloxy-ethoxypropyl]-terminated ω-$C_1$-$C_4$-alkyl terminated polydimethylsiloxane, α-[(meth)acryloxy-2-hydroxypropyl-N-ethylaminopropyl]-terminated ω-$C_1$-$C_4$-alkyl terminated polydimethylsiloxane, α-[(meth)acryloxy-2-hydroxypropyl-aminopropyl]-terminated ω-$C_1$-$C_4$-alkyl terminated polydimethylsiloxane, α-[(meth)acryloxy-2-hydroxypropyloxy-(polyethylenoxy)propyl]-terminated ω-$C_1$-$C_4$-alkyl terminated polydimethylsiloxane, α-(meth)acryloylamidopropyloxypropyl terminated ω-$C_1$-$C_4$-alkyl terminated polydimethylsiloxane, α-N-methyl-(meth) acryloylamidopropyloxypropyl terminated ω-$C_1$-$C_4$-alkyl terminated polydimethylsiloxane, α-[3-(meth)acrylamidoethoxy-2-hydroxypropyloxy-propyl]terminated ω-$C_1$-$C_4$-alkyl polydimethylsiloxane, α-[3-(meth)acrylamidopropyloxy-2-hydroxypropyloxypropyl]-terminated ω-$C_1$-$C_4$-alkyl terminated polydimethylsiloxane, α-[3-(meth)acrylamidoisopropyloxy-2-hydroxypropyloxypropyl]-terminated ω-$C_1$-$C_4$-alkyl terminated polydimethylsiloxane, α-[3-(meth)acrylamidobutyloxy-2-hydroxypropyloxypropyl]-terminated ω-$C_1$-$C_4$-alkyl terminated polydimethylsiloxane, α-[3-(meth)acryloylamido-2-hydroxypropyloxypropyl] terminated ω-$C_1$-$C_4$-alkyl polydimethylsiloxane, α-[3-[N-methyl-(meth)acryloylamido]-2-hydroxypropyloxypropyl] terminated ω-$C_1$-$C_4$-alkyl terminated polydimethylsiloxane, N-methyl-N'-(propyltetra(dimethylsiloxy)dimethylbutylsilane) (meth)acrylamide, N-(2,3-dihydroxypropane)-N'-(propyltetra(dimethylsiloxy)dimethylbutylsilane) (meth) acrylamide, (meth)acryloylamidopropyltetra (dimethylsiloxy)dimethylbutylsilane, α-vinyl carbonate-terminated ω-$C_1$-$C_4$-alkyl-terminated polydimethylsiloxanes, α-vinyl carbamate-terminated ω-$C_1$-$C_4$-alkyl-terminated polydimethylsiloxane, or a mixture thereof.

76. The method or embedded hydrogel contact lens of any one of embodiments 54 to 75, wherein the silicone hydrogel material comprises repeating units of at least one second polysiloxane vinylic crosslinker.

77. The method or embedded hydrogel contact lens of embodiment 76, wherein said at least one second polysiloxane vinylic crosslinker comprises a di-(meth)acryloyl-terminated polydimethylsiloxane, a di-vinyl carbonate-terminated polydimethylsiloxane; a di-vinyl carbamate-terminated polydimethylsiloxane; N, N, N',N'-tetrakis(3-methacryloxy-2-hydroxypropyl)-alpha,omega-bis-3-aminopropyl-polydimethylsiloxane, or a combination thereof.

78. The method or embedded hydrogel contact lens of embodiment 76, wherein said at least one second polysiloxane vinylic crosslinker comprises: (1) a vinylic crosslinker which comprises one sole polydiorganosiloxane segment and two terminal ethylenically-unsaturated groups selected from the group consisting of (meth) acryloyloxy groups, (meth)acryloylamino groups, vinyl carbonate groups, vinylcarbamate groups; and/or (2) a chain-extended polysiloxane vinylic crosslinker which comprises at least two polydiorganosiloxane segment and a covalent linker between each pair of polydiorganosiloxane segments and two two terminal ethylenically-unsaturated groups selected from the group consisting of (meth)acryloyloxy groups, (meth)acryloylamino groups, vinyl carbonate groups, vinylcarbamate groups.

79. The method or embedded hydrogel contact lens of embodiment 76, wherein said at least one second polysiloxane vinylic crosslinker comprises α, ω-bis[3-(meth) acrylamidopropyl]-terminated polydimethylsiloxane, α,ω-bis[3-(meth)acryloxypropyl]-terminated polydimethylsiloxane, α,ω-bis[3-(meth)acryloxy-2-hydroxypropyloxypropyl]-terminated polydimethylsiloxane, α,ω-bis [3-(meth)acryloxyethoxy-2-hydroxypropyloxypropyl]-terminated polydimethylsiloxane, α,ω-bis[3-(meth) acryloxypropyloxy-2-hydroxypropyloxypropyl]-terminated polydimethylsiloxane, α,ω-bis[3-(meth) acryloxy-isopropyloxy-2-hydroxypropyloxypropyl]-terminated polydimethylsiloxane, α,ω-bis[3-(meth) acryloxybutyloxy-2-hydroxypropyloxypropyl]- terminated polydimethylsiloxane, α,ω-bis[3-(meth)acrylamidoethoxy-2-hydroxypropyloxypropyl]-terminated polydimethylsiloxane, α,ω-bis[3-(meth)acrylamidopropyloxy-2-hydroxypropyloxypropyl]-terminated polydimethylsiloxane, α,ω-bis[3-(meth)acrylamidoisopropyloxy-2-hydroxypropyloxypropyl]-terminated polydimethylsiloxane, α,ω-bis[3-(meth)acrylamidobutyloxy-2-hydroxypropyloxypropyl]-terminated polydimethylsiloxane, α,ω-bis[3-(meth)acryloxyethylamino-2-hydroxypropyloxypropyl]-terminated polydimethylsiloxane, α,ω-bis[3-(meth)acryloxypropylamino-2-hydroxypropyloxypropyl]-terminated polydimethylsiloxane, α,ω-bis[3-(meth)acryloxybutylamino-2-hydroxypropyloxypropyl]-terminated polydimethylsiloxane, α,ω-bis[meth)acrylamidoethylamino-2-hydroxypropyloxy-propyl]-terminated polydimethylsiloxane, α,ω-bis[3-(meth)acrylamidopropylamino-2-hydroxypropyloxypropyl]-terminated polydimethylsiloxane, α,ω-bis[3-(meth)acrylamide-butylamino-2-hydroxypropyloxypropyl]-terminated polydimethylsiloxane, α,ω-bis[(meth)acryloxy-2-hydroxypropyloxy-ethoxypropyl]-terminated polydimethylsiloxane, α,ω-bis[(meth)acryloxy-2-hydroxypropyl-N-ethylamino-propyl]-terminated polydimethylsiloxane, α,ω-bis[(meth)acryloxy-2-hydroxypropyl-aminopropyl]-polydimethylsiloxane, α, ω-bis[(meth)acryloxy-2-hydroxypropyloxy-(polyethylenoxy) propyl]-terminated polydimethylsiloxane, α,ω-bis[(meth)acryloxyethyl-amino-carbonyloxy-ethoxypropyl]-terminated polydimethylsiloxane, α, ω-bis[(meth)acryloxyethylamino-carbonyloxy-(polyethylenoxy) propyl]-terminated polydimethylsiloxane, or combinations thereof.

80. The method or embedded hydrogel contact lens of any one of embodiments 54 to 79, wherein the silicone hydrogel material comprises repeating units of at least one non-silicone vinylic cross-linking agent.

81. The method or embedded hydrogel contact lens of embodiment 80, wherein said at least one non-silicone vinylic crossling agent comprises ethyleneglycol di-(meth)acrylate, diethyleneglycol di-(meth)acrylate, triethyleneglycol di-(meth)acrylate, tetraethyleneglycol di-(meth)acrylate, glycerol di-(meth)acrylate, 1,3-propanediol di-(meth)acrylate, 1,3-butanediol di-(meth)acrylate, 1,4-butanediol di-(meth)acrylate, glycerol 1,3-diglycerolate di-(meth)acrylate, ethylenebis[oxy(2-hydroxypropane-1,3-diyl)] di-(meth)acrylate, bis[2-(meth)acryloxyethyl] phosphate, trimethylolpropane di-(meth)acrylate, and 3,4-bis[(meth)acryloyl] tetrahydrofuan, diacrylamide, dimethacrylamide, N, N-di(meth)acryloyl-N-methylamine, N,N-di(meth)acryloyl-N-ethylamine, N,N'-methylene bis(meth)acrylamide, N,N'-ethylene bis(meth)acrylamide, N,N'-dihydroxyethylene bis(meth)acrylamide, N,N'-propylene bis(meth)acrylamide, N,N'-2-hydroxypropylene bis(meth)acrylamide, N,N'-2,3-dihydroxybutylene bis(meth)acrylamide, 1,3-bis(meth)acrylamidepropane-2-yl dihydrogen phosphate, piperazine diacrylamide, tetraethyleneglycol divinyl ether, triethyleneglycol divinyl ether, diethyleneglycol divinyl ether, ethyleneglycol divinyl ether, triallyl isocyanurate, triallyl cyanurate, trimethylopropane tri methacrylate, pentaerythritol tetramethacrylate, bisphenol A dimethacrylate, allylmethacrylate, allylacrylate, N-allyl-methacrylamide, N-allyl-acrylamide, or combinations thereof.

82. The method or embedded hydrogel contact lens of any one of embodiments 54 to 81, wherein the silicone hydrogel material comprises repeating units of at least one blending vinylic monomer.

83. The method or embedded hydrogel contact lens of embodiment 82, wherein said at least one blending vinylic monomer comprises $C_1$-$C_{10}$ alkyl (meth)acrylate, cyclopentylacrylate, cyclohexylmethacrylate, cyclohexylacrylate, isobornyl (meth)acrylate, styrene, 4,6-trimethylstyrene (TMS), t-butyl styrene (TBS), trifluoroethyl (meth)acrylate, hexafluoro-isopropyl (meth)acrylate, hexafluorobutyl (meth)acrylate, or combinations thereof.

84. The method or embedded hydrogel contact lens of any one of embodiments 54 to 83, wherein the silicone hydrogel material comprises repeating units of at least one polymerizable material selected from the group consisting of a UV-absorbing vinylic monomer, a UV/HEVL-absorbing vinylic monomer, a photochromic vinylic monomer, a polymerizable dye, and combinations thereof.

85. The method or embedded hydrogel contact lens of any one of embodiments 54 to 84, wherein the silicone hydrogel material comprises at least about 5% by weight of the first polysiloxane vinylic crosslinker.

86. The method or embedded hydrogel contact lens of any one of embodiments 54 to 84, wherein the silicone hydrogel material comprises at least about 10% by weight of the first polysiloxane vinylic crosslinker.

87. The method or embedded hydrogel contact lens of any one of embodiments 54 to 84, wherein the silicone hydrogel material comprises at least about 15% by weight of the first polysiloxane vinylic crosslinker.

88. The method or embedded hydrogel contact lens of any one of embodiments 54 to 84, wherein the silicone hydrogel material comprises at least about 20% by weight of the first polysiloxane vinylic crosslinker.

89. The method or embedded hydrogel contact lens of any one of embodiments 54 to 84, wherein the silicone hydrogel material comprises at least about 25% by weight of the first polysiloxane vinylic crosslinker.

90. The method or embedded hydrogel contact lens of any one of embodiments 53 to 89, wherein the first and second hydrogel materials are identical to each other.

91. The method or embedded hydrogel contact lens of any one of embodiments 53 to 89, wherein the first and second hydrogel materials are different from each other.

92. The method or embedded hydrogel contact lens of embodiment 91, wherein the second hydrogel material is softer than the first hydrogel material as measured by having a ratio of indentation depth ratio, $$\frac{(Id)_{PS}}{(Id)_{AS}},$$

or at least about 1.2 (preferably at least about 1.3, more preferably at least about 1.4, even more preferably at least about 1.5, most preferably at least about 1.6), wherein $(Id)_{PS}$ is the indentation depth measured with a indenting probe having a tip radius of 9.5 μm and a stiffness of 0.54 N/m at 5 KPa compression pressure against the posterior surface in a nanoindentation test, wherein $(Id)_{AS}$ is the indentation depth measured with a indenting probe having a tip radius of 9.5 μm and a stiffness of 0.54 N/m at 5 KPa compression pressure against the anterior surface in a nanoindentation test.

93. The method or embedded hydrogel contact lens of embodiment 91, wherein the second hydrogel material is softer than the first hydrogel material as measured by having a ratio of indentation depth ratio, $$\frac{(Id)_{PS}}{(Id)_{AS}},$$

of at least about 1.3.

94. The method or embedded hydrogel contact lens of embodiment 91, wherein the second hydrogel material is softer than the first hydrogel material as measured by having a ratio of indentation depth ratio, $$\frac{(Id)_{PS}}{(Id)_{AS}},$$

of at least about 1.4.

95. The method or embedded hydrogel contact lens of embodiment 91, wherein the second hydrogel material is softer than the first hydrogel material as measured by having a ratio of indentation depth ratio, $$\frac{(Id)_{PS}}{(Id)_{AS}},$$

or at least about 1.5.

96. The method or embedded hydrogel contact lens of embodiment 91, wherein the second hydrogel material is softer than the first hydrogel material as measured by having a ratio of indentation depth ratio, $$\frac{(Id)_{PS}}{(Id)_{AS}},$$

or at least about 1.6.

97. The method or embedded hydrogel contact lens of any one of embodiments 53 to 96, wherein the first and second hydrogel materials independently of each other have an equilibrium water content (i.e., in fully hydrated state or when being fully hydrated) of from about 20% to about 70% by weight, an oxygen permeability of at least about 40 barrers, and a modulus (i.e., Young's modulus) of about 1.5 MPa or less.

98. The method or embedded hydrogel contact lens of embodiment 97, wherein the first and second hydrogel materials independently of each other have an equilibrium water content (i.e., in fully hydrated state or when being fully hydrated) of from about 20% to about 65% by weigh.

99. The method or embedded hydrogel contact lens of embodiment 98, wherein the first and second hydrogel materials independently of each other have an equilibrium water content (i.e., in fully hydrated state or when being fully hydrated) of from about 25% to about 65% by weigh.

100. The method or embedded hydrogel contact lens of embodiment 98, wherein the first and second hydrogel materials independently of each other have an equilibrium water content (i.e., in fully hydrated state or when being fully hydrated) of from about 30% to about 60% by weigh.

101. The method or embedded hydrogel contact lens of any one of embodiments 98 to 100, wherein the first and second hydrogel materials independently of each other have an oxygen permeability of at least about 60 barrers.

102. The method or embedded hydrogel contact lens of any one of embodiments 98 to 100, wherein the first and second hydrogel materials independently of each other have an oxygen permeability of at least about 80 barrers.

103. The method or embedded hydrogel contact lens of any one of embodiments 98 to 100, wherein the silicone hydrogel material has an oxygen permeability of at least about 100 barrers.

104. The method or embedded hydrogel contact lens of any one of embodiments 98 to 103, wherein the first and second hydrogel materials independently of each other have a modulus (i.e., Young's modulus) of from about 0.2 MPa to about 1.2 MPa.

105. The method or embedded hydrogel contact lens of any one of embodiments 98 to 103, wherein the first and second hydrogel materials independently of each other have a modulus (i.e., Young's modulus) of from about 0.3 MPa to about 1.1 MPa.

106. The method or embedded hydrogel contact lens of any one of embodiments 98 to 103, wherein the first and second hydrogel materials independently of each other have a modulus (i.e., Young's modulus) of from about 0.4 MPa to about 1.0 MPa.

The previous disclosure will enable one having ordinary skill in the art to practice the invention. Various modifications, variations, and combinations can be made to the various embodiment described herein. In order to better enable the reader to understand specific embodiments and the advantages thereof, reference to the following examples is suggested. It is intended that the specification and examples be considered as exemplary.

Example 1

Oxygen Permeability Measurements

Unless specified, the oxygen transmissibility (Dk/t), the intrinsic (or edge-corrected) oxygen permeability ($Dk_i$ or $Dk_c$) of an insert and an insert material are determined according to procedures described in ISO 18369-4.

Equilibrium Water Content

The equilibrium water content (EWC) of contact lenses is determined as follows.

Amount of water (expressed as percent by weight) present in a hydrated hydrogel contact lens, which is fully equilibrated in saline solution, is determined at room temperature. Quickly stack the lenses, and transfer the lens stack to the aluminum pan on the analytical balance after blotting lens in a cloth. The number of lenses for each sample pan is typically five (5). Record the pan plus hydrated weight of the lenses. Cover the pan with aluminum foil. Place pans in a laboratory oven at 100±2° C. to dry for 16-18 hours. Remove pan plus lenses from the oven and cool in a desiccator for at least 30 minutes. Remove a single pan from the desiccator, and discard the aluminum foil. Weigh the pan plus dried lens sample on an analytical balance. Repeat for all pans. The wet and dry weight of the lens samples can be calculated by subtracting the weight of the empty weigh pan.

Refractive Index

The refractive index (RI) of inserts is determined by Abbe tranmission laboratory refractometer Reichert Abbe Mark III at 25° C. The inserts are fully equilibrated in PBS saline solution before measurement.

Elastic Modulus

The storage modulus (Young's modulus) of inserts is determined using a TA RSA-G2 DMA (Dynamic Mechanical Analyzer). The insert is cut into a 3.08 mm wide strip using Precision Concept dry lens cutter. Five thickness values are measured within 6.5 mm gauge length. The strip is mounted on the instrument with metal grips. Oscillation temperature ramp test with a linear ramping rate at 2° C./minute from 10° C.~-50° C. is applied on the insert, the material response to increasing temperature is monitored at a constant frequency of 1 Hz, constant amplitude of 0.5% deformation and sampling rate of 10.0 pts/s. Storage modulus (E'), loss modulus (E") and tan 8 data are calculated by TRIOS software.

The elastic modulus of a silicone hydrogel material or contact lens is determined using a MTS insight instrument. The contact lens is first cut into a 3.12 mm wide strip using Precision Concept two stage cutter. Five thickness values are measured within 6.5 mm gauge length. The strip is mounted on the instrument grips and submerged in PBS (phosphate buffered saline) with the temperature controlled at 21±2° C. Typically 5N Load cell is used for the test. Constant force and speed is applied to the sample until the sample breaks. Force and displacement data are collected by the TestWorks software. The elastic modulus value is calculated by the TestWorks software which is the slope or tangent of the stress vs. strain curve near zero elongation, in the elastic deformation region.

Delamination

Embedded hydrogel contact lenses are examined for possible delamination either using Optimec instrument or Optical Coherence Tomography (OCT).

Regardless of evaluation method, contact lenses are staged for a minimum of 12 hours at room temperature after autoclave run and prior to delamination study.

After meeting required staging time, fully hydrated contact lens is placed in a "V" graticule assembly of Optimec instrument (Model JCF; OPTIMEC England). After the contact lens is settled under the influence of gravity, the front view of the contact lens is inspected carefully for any sign of circular pattern. Delamination displays as circular patterns in Optimec image.

OCT (Spectral Domain Optical Coherence Tomography; Telesto-II; Thorlabs) could also be utilized to study delamination. OCT allows non-invasive imaging of the contact lens to obtain high resolution cross-section image. For this purpose, after meeting the minimum staging requirement, the contact lens is removed from its blister and is soaked into PBS solution for a minimum of 30 min to come to equilibrium. Then a cuvette with a "V" block feature will be filled approximately ¾ with fresh PBS solution and the contact lens will be transferred to the cuvette using Q-tips. The lens will be allowed to freely float to the "V" shape at the bottom of the cuvette and the entire contact lens will be scanned in increment of 10 degree. Delamination appears as air pocket in interval surface of insert and carrier in OCT images.

Surface Softness of Contact Lenses

Nano-Indentation Tests

The indentation depth of an indenting probe having a tip radius of 9.5 μm and a stiffness of 0.54 N/m at 5 KPa compression pressure against one of the surfaces of a contact lens is measured in micro-indentation tests as follows.

Figure 3:
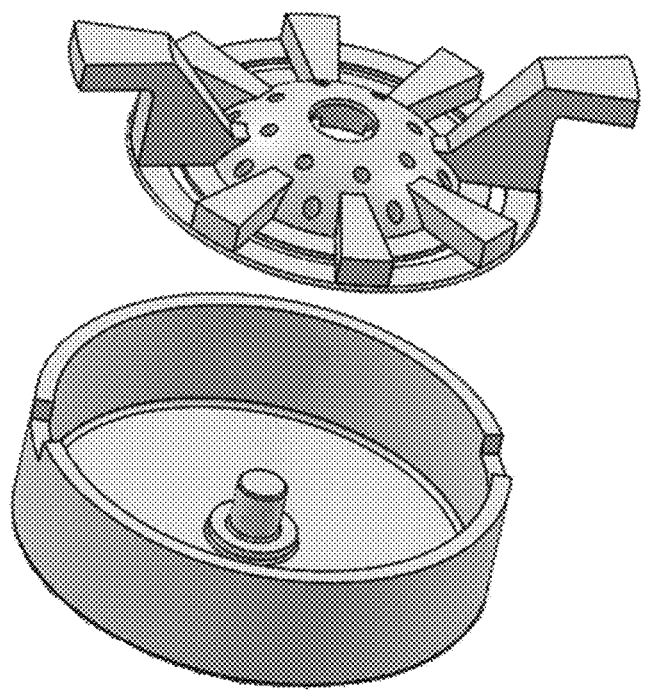
FIG. 3 schematically illustrates a lens holder for performing nano-indentation measurements of contact lenses with Optics 11 Puima nano-indentation instrument.

The Optics 11 Piuma device is used to determine indentation depth function of displacement. Before indentations are performed, the Piuma probe is calibrated in the testing solution of choice (i.e. PuriLens plus, OPTIFREE Replenish vehicle, PBS), following instructions from the manual (see https://optics11life.com/wp/context/uploads/2019/05/Piuma-Nanoindenter-Manual.pdf). This calibration consists of first calibrating the optical sensor while the probe is submersed in the testing solution, but not engaged in contact with a surface of a substrate. Next, a second cantilever calibration is performed by making a test indentation on a glass slide. Lenses are rinsed with the testing solution to wash off excess lens package solution (30-50 ml of testing solution for 10-20 minutes). The lens holder bottom (shown in FIG. 3) is filled with 25 ml of testing solution and allowed to degas for at least 5 minutes. After soaking, the lens is placed (testing side up) onto the center post of the lens holder bottom. The lens should be placed so the lens edge is facing away from the holder. Then the lens is inverted onto the post, minimizing leaving air bubbles or excess testing solution.

The top piece is placed onto the bottom piece, and locked into place, firmly seating the lens. Then the holder is placed onto the testing the stage, and the lens center is aligned with the probe. Ensure enough testing solution fully submerges the sample.

Finally, the Piuma probe is brought just above lens surface (~1-2 mm away), submerging the probe in the test solution. Continue dripping solution down the probe surface until the cantilever is fully immersed and the signal is stable.

The nano-indentation "find surface" routine is performed according to the manufacturer's typical procedures. The indentation routine consists of a 10 μm indentation at a rate of 1 μm/sec. The probe moves to the surface, where the contact point is determined by the first deflection detected by the cantilever. Typically 3 indents are made at multiple spots (i.e. 16) on the lens surface at large distances between spots (i.e. 250 microns), and five lenses per lens type typically are tested.

The typical Piuma probe used to characterize surface modulus between 1-500 kPa has a stiffness of 0.54 N/m and a tip radius of 9.5 μm. The area of contact of the spherical cap ($S_{cap}$) can be calculated by:

$$S_{cap}=2\pi Rh$$

in which "R" is the tip radius and h is the indentation depth.

As the indentation is performed, both the depth of the indentation and the indentation force is recorded. To calculate the indentation depth at 5 kPa, the indent force is divided by the contact area of the spherical cap to obtain indentation pressure. The indent distance at 5 kPa (typical eyelid pressure is between 1-5 kPa) can be reported from this data set.

All the raw data is processed using MATLAB and analyzed using Excel.

Chemicals

The following abbreviations are used in the following examples: TrisMA represents 3-[Tris(trimethylsiloxy)silyl]propyl methacrylate; Tris-Sty represents 4-[Tris(trimethylsiloxy)silyl]styrene; DMS-R11 represents methacryloxypropyl-terminated polydimethylsiloxane (Mw~1000 Da); DMA represents N,N-dimethyl acrylamide; VAZO 67 represents 2,2'-azobis(2-methylbutyronitrile); DVB represents divinyl benzene; RB247 is Reactive Blue 247; PPG425 represents poly(propylene glycol) (Mn~425; from Sigma-Aldrich); PBS represents a phosphate-buffered saline which has a pH of 7.2±0.2 at 25° C. and contains about 0.044 wt. % $NaH_2PO_4.H_2O$, about 0.388 wt. % $Na_2HPO_4.2H_2O$, and about 0.79 wt. % NaCl and; wt. % represents weight percent; "H4" macromer represents a di-methacryloyloxypropyl-terminated polysiloxane (Mn~11.3K-12.3K g/mol, OH content~1.82-2.01 meq/g) of formula (A) shown below.

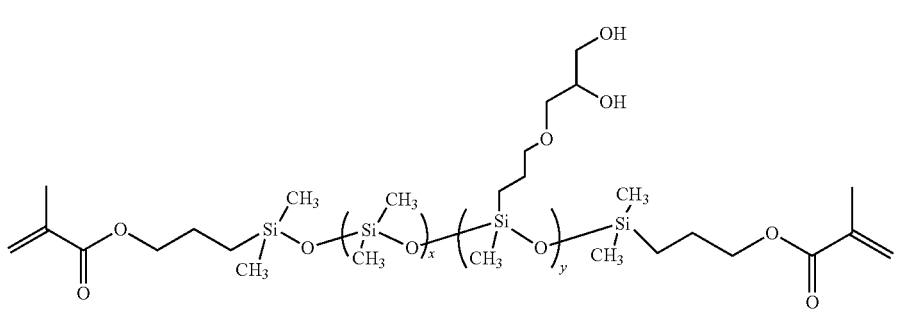

(A)

Example 2

Insert-Forming Composition

An insert-forming compositions (i.e., Insert formulations) for making rigid hydrophobic inserts are prepared at room temperature in air by blending all the components (materials) as following: 20 weight part units of DMS-R11; 70 weight part units of Tris-Sty; 10 weight part units of DVB; 0.01 weight part units of RB247; and 0.5 weight part units of Vazo-67.

Lens-Forming Compositions

A lens-forming composition (i.e., SiHy lens formulation) is prepared at room temperature in air by blending all the components (materials) in their desired amounts (weight parts units) to have the following composition: 32 weight part units of H4; 21 weight part units of TrisMA; 24 weight part units of DMA; 22 weight part units of PPG425; and 1 weight part units of Darocur 1173.

Preparation of Embedded Silicone Hydrogel Contact Lenses

Figure 4:
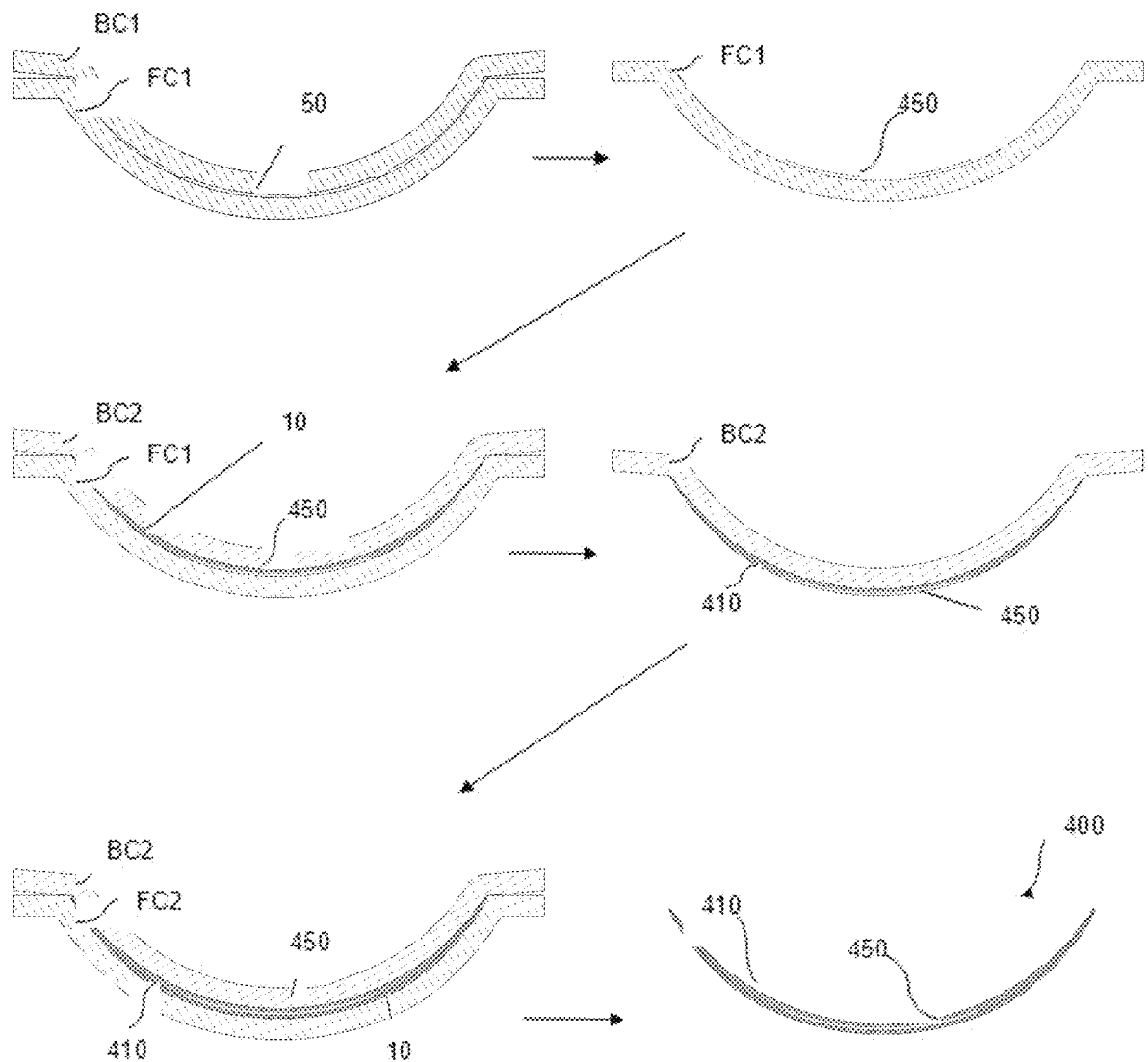
FIG. 4 schematically illustrates a method for making an embedded hydrogel contact lens according to a preferred embodiment of the invention.

The procedures for preparing embedded SiHy contact lenses are schematically illustrated in FIG. 4.

An insert-forming composition prepared above is purged with nitrogen at room temperature for 30 to 35 minutes. An amount of the $N_2$-purged insert-forming composition 50 is disposed on a central portion of the molding surface of a first female mold half FC1 that is made of polypropylene and has a molding surface the central portion of which defines the front surface of an insert 450. The first female lens mold half FC1 with the insert-forming composition 50 therein is closed with a first male mold half BC1, which is made of polypropylene and has a molding surface defining the back surface of the insert 450, to form the first molding assembly. The oven is configured as follows: a nitrogen supply is connected to the oven through a higher flow capacity controller which can control the flow rate of nitrogen through the oven; at the exhaust line of the oven, vacuum pumps are connected to control the differential pressure of the oven.

The insert-forming compositions 50 in the first molding assemblies are thermally cured in the oven under the following conditions: ramp from room temperature to 55° C. at a ramp rate of about 7° C./minute; holding at 55° C. for about 30-40 minutes; ramp from 55° C. to 80° C. at a ramp rate of about 7° C./minute; holding at 55° C. for about 30-40 minutes; ramp from 80° C. to 100° C. at a ramp rate of about 7° C./minute; and holding at 100° C. for about 30-40 minutes. The first molding assemblies are opened and the molded inserts 450 each are adhered on the molding surface of the first female mold halves FC1.

The lens-forming composition prepared above is purged with nitrogen at room temperature for 30 to 35 minutes. A first amount (e.g., about 60 microliters) of the $N_2$-purged lens-forming composition 10 is disposed onto the molded insert 450 adhered onto the central portion of the molding surface of the first female lens mold half FC1. The first female lens mold half FC1 with the insert 450 adhered thereonto and with the lens-forming composition 10 therein is closed with a second male lens mold half BC2 which is made of polypropylene, to form a second molding assembly. The second male lens mold half BC2 has a molding surface defining the posterior surface of a contact lens to be molded.

The closed $2^{nd}$ molding assemblies each with a molded insert 450 immersed in the lens-forming composition 10 in the molding cavities are actinically cured by UV/visible light (Hamamatsu lamp) at an intensity of 5 mW/cm² for about 30 minutes. The $2^{nd}$ molding assemblies each with a molded lens precursor 410 therein are mechanically opened. The molded lens precursor 410, which has a convex surface defined by the molding surface of FC1 and an opposite concave surface that is defined by the molding surface of BC2 and is the posterior surface of the embedded hydrogel contact lens 400. The second molding assemblies are opened and the molded lens precursors 410 each are adhered on the molding surface of the second male mold halves BC2 and each have an molded insert 450 partially embedded therein.

A second amount (e.g., about 60 microliters) of the $N_2$-purged lens-forming composition 10 is disposed onto the molding surface of the second female lens mold half FC2. The second female lens mold half FC2 with the lens-forming composition 10 is closed with the second male lens mold half BC2 with the molded lens precursor 410 adhered thereonto, to form a third molding assembly. The second female lens mold half FC2 has a molding surface defining the anterior surface of a contact lens to be molded.

The closed third molding assemblies each with a molded lens precursor 410 immersed in the lens-forming composition in the molding cavities are actinically cured by UV/visible light (Hamamatsu lamp) at an intensity of 5 mW/cm² for about 30 minutes. The third molding assemblies each with an embedded hydrogel contact lens 400 therein are mechanically opened. The molded embedded hydrogel contact lens 400, which has the anterior surface defined by the molding surface of FC1 and the opposite posterior surface defined by the molding surface of BC2 and comprises the insert 450 sandwiched between two layers of a hydrogel material (identical to each other) formed from the same lens-forming composition 10, adhere to one of the second male mold halves BC2 or the second female mold halves FC2.

Molded embedded silicone hydrogel contact lenses adhered to male mold halves are delensed using ultrasonic unit; molded embedded silicone hydrogel contact lenses adhered to female mold halves are delensed are manually from lens-adhered female mold halves.

The delensed embedded silicone hydrogel contact lenses can be extracted with a mixture of 50:50 of propylene glycol:water. Preferably, the delensed embedded silicone hydrogel contact lenses are subjected to the following extraction/hyradtion, coating, autoclave processes as follows. The embedded silicone hydrogel contact lenses are soaked in a bath containing deionized water or an aqueous solution of Tween 80 (500 PPM), for about 60 minutes, then in a bath containing an aqueous solution of polyacrylic acid (PAA, Mw 450K) at a concentration of ca. 0.1% by weight at 40° C. for about 120 minutes; then in a bath containing a PBS solution at room temperature for about 60 minutes; packed/sealed in polypropylene lens packaging shells (or blisters) (one lens per shell) with 0.65 mL of a in-package-coating packaging saline which is prepared according to the procedure described in Example 19 of U.S. Pat. No. 8,480,227; and finally autoclaved for about 45 minutes at 121° C. The resultant embedded SiHy contact lenses each have a hydrogel coating thereon.

All the publications, patents, and patent application publications, which have been cited herein above in this application, are hereby incorporated by reference in their entireties.

What is claimed is:

1. A method for producing embedded hydrogel contact lenses, comprising the steps of:
    (1) obtaining a first female mold half, a first male mold half, a second female mold half, and a second male mold half, wherein the first female mold half has a first molding surface having a central portion defining the front surface of a to-be-molded insert, wherein the first male mold half has a second molding surface defining the back surface of the to-be-molded insert, wherein the second female mold half has a third molding surface defining the anterior surface of an embedded hydrogel contact lens, wherein the second male mold half has a fourth molding surface defining the posterior surface of the embedded hydrogel contact lens, wherein the first female mold half and the first male mold half are configured to receive each other such that a first molding cavity is formed between the central portion of the first molding surface and the second molding surfaces when the first female and first male mold halves are closed securely, wherein the first female mold half and the second male mold half are configured to receive each other such that a second molding cavity is formed between the first and fourth molding surfaces when the first female mold half is closed with the second male mold half, wherein the second female mold half and the second male mold half are configured to receive each other such that a third molding cavity is formed between the third and fourth molding surfaces when the second female mold half is closed securely with the second male mold half;
    (2) dispensing an amount of an insert-forming composition on the central portion of the first molding surface of the first female mold half;
    (3) placing the first male mold half on top of the insert-forming composition in the first female mold half and closing the first male mold half and the first female mold half to form a first molding assembly comprising the insert-forming composition therein;
    (4) curing the insert-forming composition in the first molding assembly to form a molded insert that is made of a crosslinked polymeric material formed from the insert-forming composition and has the front surface defined by the central portion of the first molding surface and the back surface defined by the second molding surface;
    (5) separating the first molding assembly obtained in step (4) into the first male mold half and the first female mold half with the molded insert adhered onto the central portion of the first molding surface of the first female mold half;
    (6) dispensing an amount of a first lens-forming composition over the molded insert adhered on the central portion of the first molding surface in the first female mold half;
    (7) placing the second male mold half on top of the first female mold half and closing the second male mold half and the first female mold half to form a second molding assembly comprising the first lens-forming composition and the molded insert immersed therein in the second molding assembly;
    (8) curing the first lens-forming composition in the second molding assembly to form a lens precursor having a convex surface defined by the first molding surface and an opposite concave surface that is defined by the fourth molding surface and is the posterior surface of the embedded hydrogel contact lens, wherein the lens precursor comprise a first hydrogel material formed from the first lens-forming composition and the insert embedded in the first material in such a way that the front surface of the insert merges with the convex surface of the lens precursor while the back surface of the insert is buried beneath the concave surface of the lens precursor;
    (9) separating the second molding assembly obtained in step (8) into the second male mold half and the female mold half, with the lens precursor adhered on the second male mold half;
    (10) dispensing an amount of a second lens-forming composition on the third molding surface of the second female mold half; over the molded insert adhered on the central portion of the first molding surface in the first female mold half;
    (11) placing the second male mold half obtained in step (9) on top of the second female mold half and closing the second male mold half and the second female mold half to form a third molding assembly comprising the second lens-forming composition and the lens precursor immersed therein in the third molding assembly;
    (12) curing the second lens-forming composition in the third molding assembly to form an embedded hydrogel contact lens that comprises the insert sandwiched between the first hydrogel material and a second hydrogel material formed from the second lens-forming composition; (13) separating the third molding assembly obtained in step (12) into the second male mold half and the second female mold half, with the embedded hydrogel contact lens adhered on one of the second male mold half and the second female mold half;
    (14) removing the embedded hydrogel contact lens from the lens-adhered mold half; and
    (15) subjecting the embedded hydrogel contact lens to post-molding processes including a hydration process and one or more other processes selected from the group consisting of extraction, surface treatment, packaging, sterilization, and combinations thereof.

2. The method of claim 1, wherein the step of (4) curing the insert-forming composition is carried out photochemically by using UV and/or visible light.

3. The method of claim 1, wherein the step of (4) curing the insert-forming composition is carried out thermally by heating the first molding assembly in an oven at one or more curing temperature selected from about 40° C. to about 100° C.

4. The method of claim 2, wherein the step of (8) curing the first lens-forming composition is carried out photochemically by using UV and/or visible light.

5. The method of claim 3, wherein the step of (8) curing the first lens-forming composition is carried out thermally by heating the second molding assembly in an oven at one or more curing temperature selected from about 40° C. to about 100° C.

6. The method of claim 5, wherein the step of (12) curing the second lens-forming composition is carried out photochemically by using UV and/or visible light.

7. The method of claim 4, wherein the step of (12) curing the second lens-forming composition is carried out photochemically by using UV and/or visible light.

8. The method of claim 2, wherein the step of (12) curing the second lens-forming composition is carried out photochemically by using UV and/or visible light.

9. The method of claim 3, wherein the step of (12) curing the second lens-forming composition is carried out thermally by heating the second molding assembly in an oven at one or more curing temperature selected from about 40° C. to about 100° C.

* * * * *